United States Patent
Sharp et al.

(10) Patent No.: US 12,248,204 B1
(45) Date of Patent: Mar. 11, 2025

(54) BROADBAND POLARIZATION ROTATOR AND OPTICAL SWITCH

(71) Applicant: Meta Platforms Technologies, LLC, Menlo Park, CA (US)

(72) Inventors: Gary D. Sharp, Boulder, CO (US); David Coleman, Louisville, CO (US)

(73) Assignee: Meta Platform Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/141,972

(22) Filed: May 1, 2023

(51) Int. Cl.
| | | |
|---|---|---|
| *G02F 1/13363* | (2006.01) | |
| *G02F 1/01* | (2006.01) | |
| *G02F 1/1335* | (2006.01) | |
| *G02F 1/139* | (2006.01) | |
| *G06F 1/16* | (2006.01) | |
| *G02B 27/01* | (2006.01) | |

(52) U.S. Cl.
CPC ...... *G02F 1/0136* (2013.01); *G02F 1/133553* (2013.01); *G02F 1/133616* (2021.01); *G02F 1/13363* (2013.01); *G02F 1/1398* (2021.01); *G06F 1/163* (2013.01); *G02B 27/0172* (2013.01); *G02F 2203/02* (2013.01); *G02F 2413/07* (2013.01)

(58) Field of Classification Search
CPC ............ G02F 1/0136; G02F 1/133553; G02F 1/133616; G02F 1/1398
See application file for complete search history.

(56) References Cited

U.S. PATENT DOCUMENTS

| | | | | |
|---|---|---|---|---|
| 5,990,996 A | * | 11/1999 | Sharp ................. | G02F 1/13363 349/97 |
| 2006/0291053 A1 | * | 12/2006 | Robinson ............. | G02B 30/25 359/465 |
| 2019/0018177 A1 | * | 1/2019 | Sharp ................. | G02B 5/3083 |
| 2022/0382102 A1 | * | 12/2022 | Zhong ................. | G02F 1/1398 |

\* cited by examiner

*Primary Examiner* — Paisley L Wilson
(74) *Attorney, Agent, or Firm* — Greenberg Traurig, LLP

(57) ABSTRACT

A reflective polarization rotator based on a twisted nematic (TN) liquid crystal (LC) configuration may be optimized for achromatic performance in both bright and dark states by compensating wavelength dependence of polarization transformation by the TN LC layer. At linear achromatic input polarization, the compensation aims to provide a circular achromatic polarization at the reflector, which guarantees the achromaticity of the 90 degrees polarization rotation on double pass. The compensation takes care to preserve linear polarization at the reflector when the LC device is driven to a vertical LC director configuration. Such an approach ensures that the performance of the polarization rotator is achromatic in both driven and undriven states of the LC device.

20 Claims, 18 Drawing Sheets

BROADBAND POLARIZATION ROTATOR AND OPTICAL SWITCH

TECHNICAL FIELD

The present disclosure relates to polarization rotators and optical switches, and visual displays based on arrays of polarization rotators.

BACKGROUND

Visual displays provide information to viewer(s) including still images, video, data, etc. Visual displays have applications in diverse fields including entertainment, education, engineering, science, training, advertising, to name just a few examples. Some visual displays, such as TV sets, display images to several users, while some visual display systems, such s near-eye displays (NEDs), are intended for use by individual viewers. NEDs wearable on the user's head may be self-contained, or may be connected to a controller or a console providing the video feed and/or required control functions.

An artificial reality system may include an NED, e.g. a headset or a pair of glasses, configured to present content to a user. The NED may display virtual objects or combine images of real objects with virtual objects in virtual reality (VR), augmented reality (AR), or mixed reality (MR) applications. The artificial imagery may be generated by miniature displays, which may include scanning- or microdisplay-based image projectors.

Because a display of HMD is worn on the head of a user, a large, bulky, unbalanced, and/or heavy display device would be cumbersome and uncomfortable for the user to wear. Consequently, head-mounted display devices can benefit from a compact and efficient configuration, including efficient multi-color light sources and image projectors, high-throughput ocular lenses, optical switches, high-contrast miniature display panels, diffractive optical elements, and other compact optical elements and modules in the image forming train.

BRIEF DESCRIPTION OF THE DRAWINGS

Exemplary embodiments will now be described in conjunction with the drawings, in which.

DETAILED DESCRIPTION

Figure 1:
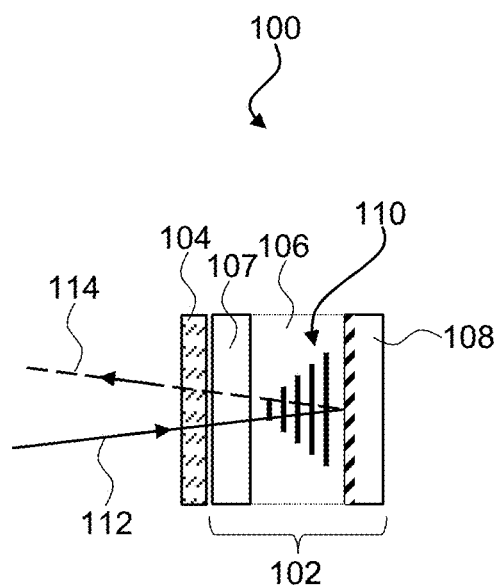
FIG. 1 is a schematic cross-sectional view of an optical switch based on a reflective twisted nematic (TN) liquid crystal (LC) polarization rotator coupled to a sheet polarizer.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 7A-7B, 9A-9B, 10, and 12A-12B, similar reference numerals denote similar elements.

An optical switch based on a polarization rotator between a pair of polarizers may have a brightness and/or contrast ratio dependent on wavelength of illuminating light. For display implementations of such optical switches, e.g. liquid crystal (LC) displays, the display brightness and/or contrast ratio may depend on the displayed color, i.e. the display brightness and/or contrast may be different for red, green, and blue color channels. For LC displays including arrays of polarization rotating pixels, retardation sheets may be added to the display to improve the performance of the energized state by compensating for a residual birefringence of near-electrode boundary LC sub-layers that mostly retain in-plane orientation even in the energized state.

Since the contrast ratio is usually a more important parameter than color uniformity in the bright state, the energized state of the LC polarization rotators is assigned to the black level or zero output, a configuration termed "drive-to-black", and is compensated with retardation sheets. However, the bright state still remains non-compensated. In an opposite, "drive-to-white" configuration, the bright field is color-uniform, but the contrast ratio is poor due to the non-compensated undriven state.

In accordance with this disclosure, properties of retarder stacks in a double-pass reflective configuration may be utilized to provide dispersion compensation for a LC polarization rotator in both driven and undriven states. The dispersion compensation in both states allows one to build optical switches and visual display panels having both a color-uniform bright field and high contrast at the same time. The achromatic bright and dark fields occur in both drive-to-black and drive-to-white configurations of the optical switch and/or visual display. To achieve achromaticity, a polarization rotator based on twisted nematic (TN) liquid crystals may be equipped with a passive compensating structure (PCS) including a stack of fixed-retardation layers of pre-configured retardation and optic axis orientation. The PCS "undoes" the wavelength-selective retardation of a TV LC cell in a manner that does not worsen the performance in the driven state (i.e. the state with the applied electric field) when the TN LC is predominantly vertically aligned, allowing both the driven and undriven state to be achromatic.

In accordance with the present disclosure, there is provided a polarization rotator comprising a reflective liquid crystal (LC) device comprising an LC layer coupled to a reflector. The LC layer is switchable between an undriven state having a twisted LC director configuration, and a driven state having a substantially vertical LC director configuration. When in the undriven state, the LC layer converts, on a single pass of a light beam, a first achromatic polarization state of the light beam into a first wavelength distribution of polarization states.

The polarization rotator further comprises a passive compensation structure (PCS), which is also termed "dispersive rotator", disposed upstream of the LC device. The PCS may include a stack of fixed-retardation layers configured to convert, on a single pass of the light beam, a second achromatic polarization state of the light beam into a second wavelength distribution of polarization states matching the first wavelength distribution. In some embodiments, when the LC layer is in the undriven state and the light beam impinging onto the PCS is in the second achromatic polarization state, a polarization state of the light beam at the reflector is the first achromatic polarization state.

In operation, a non-zero voltage may be applied to the LC layer in the undriven state for a better match of the first and second wavelength distributions of polarization states as compared to a match of the first and second wavelength distributions when a zero voltage is applied to the LC layer. A twist angle of the twisted LC director configuration may be less than 90 degrees.

When the LC layer is in the undriven state, the polarization rotator may convert between orthogonal achromatic polarization states of the light beam propagated through the PCS, the LC layer, reflected by the reflector, and propagated back through the LC layer and the PCS. When the LC layer is in the undriven state and a polarization state of the light beam impinging onto the PCS is an achromatic linear polarization state, a polarization state of the light beam at the reflector may be an achromatic circular polarization state.

When the LC layer is in the driven state, the polarization rotator may substantially preserve, at its output, an achromatic polarization state of the light beam impinging onto the polarization rotator. When the LC layer is in the driven state and a polarization state of the light beam impinging onto the PCS is an achromatic linear polarization state, a polarization state of the light beam at the reflector is a non-achromatic linear polarization state.

In some embodiments, when the LC layer is in the undriven state, the polarization rotator converts between orthogonal achromatic polarization states of the light beam e.g. in a spectral bandwidth of between 450 nm and 700 nm. When the LC layer is in the driven state, the polarization rotator substantially preserves an achromatic polarization state of the light beam e.g. in the spectral bandwidth of between 450 nm and 700 nm. In embodiments where the stack of fixed-retardation layers comprises A-plates, all A-plates of the stack may have substantially a same in-plane retardation and differing directions of optic axis. The stack may further include a C-plate for improving off-axis performance of the polarization rotator. The stack of fixed-retardation layers may include e.g. a cyclic olefin polymer.

In accordance with the present disclosure, there is provided an optical switch comprising a frontlight illuminator for providing a light beam, a polarization rotator of this disclosure disposed downstream of the frontlight illuminator, for receiving and redirecting the light beam to propagate back through the frontlight illuminator, and a polarizer downstream of the polarization rotator for transmitting or blocking the light beam depending on a polarization state of the light beam. The LC layer of the polarization rotator may include an array of individually controllable LC pixels. The frontlight illuminator may include at least one of an evanescent out-coupler or a replicating lightguide for providing a portion of the light beam to each LC pixel of the array.

In accordance with the present disclosure, there is provided a passive compensation structure (PCS) for an LC layer switchable between an undriven state having a twisted LC director configuration and a driven state having a substantially vertical LC director configuration. When in the undriven state, the LC layer converts, on a single pass of a light beam, a first achromatic polarization state of the light beam into a first wavelength distribution of polarization states.

The PCS may include a stack of fixed-retardation layers configured to convert, on a single pass of the light beam, a second achromatic polarization state of the light beam into a second wavelength distribution of polarization states matching the first wavelength distribution. In some embodiments, when the LC layer is in the undriven state and the light beam impinging onto the PCS is in the second achromatic polarization state, a polarization state of the light beam at an output of the LC layer is the first achromatic polarization state.

In a reflective liquid crystal display (LCD) or optical switching device, input light makes a forward pass, is reflected by a mirror, and makes a reverse pass through an LC cell. The LC cell includes an LC layer, which may be pixelated to make the switching spatially selective, e.g. for a visual display application. In reflective polarization-selective LC devices, an input light beam needs to be polarized. The input beam may be polarized using e.g. a sheet polarizer or a polarization beam splitter (PBS) placed upstream of a reflective LC cell.

FIG. 1 is an illustrative example of a reflective LC optical switch 100 includes a reflective LC device 102 and a transmissive sheet polarizer 104 optically coupled to the reflective LC device 102 upstream of the reflective LC device 102. The latter includes an LC layer 106 between a transparent electrode 107 and a reflective electrode 108. In an undriven or low-voltage state, a director of the LC layer 106 adopts a twisted configuration 110 with the twist angle that may range e.g. between 60 and 75 degrees, providing approximately a quarter-wave optical retardation on a single pass of an impinging light beam 112. In a driven or high-voltage state, the director adopts a near-vertical configuration, i.e. the twisted configuration 110 becomes a near-vertical orientation of LC molecules throughout the bulk of the LC layer 106, providing a near-zero optical retardation for the impinging light beam 112.

The light beam 112 propagates through, and is polarized by, the transmissive sheet polarizer 104 to have a linear polarization perpendicular to a plane of FIG. 1. The polarized light beam 112 propagates through the LC layer 106, is reflected by the reflective electrode 108, and propagates back through the LC layer 106. When the LC layer 106 is in the undriven state, the light beam 112 acquires approximately a half-wave retardation upon double pass propagation through the LC layer 106, and becomes linearly polarized in plane of FIG. 1. The light beam 112 is blocked by the transmissive sheet polarizer 104. When the LC layer 106 is in the driven state, the polarization of the light beam 112 is preserved, allowing the light beam 112 to propagate through the transmissive sheet polarizer 104 and form an output beam 114. Thus, the optical switch 100 operates in a drive-to-white configuration.

Figure 2:
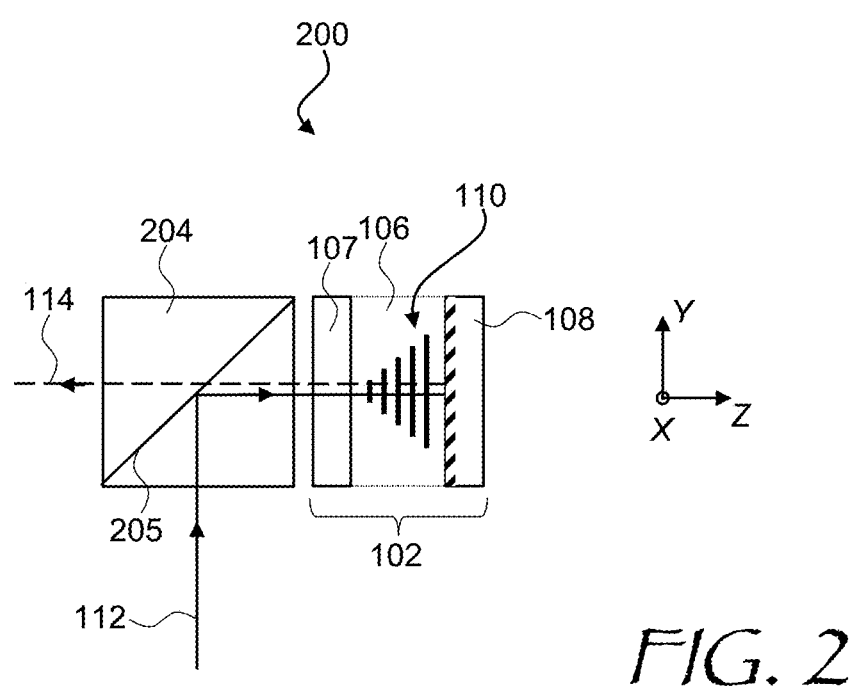
FIG. 2 is a schematic cross-sectional view of an optical switch based on the reflective TN LC polarization rotator coupled to a polarization beamsplitter (PBS)

In FIG. 1, the input and output light beams are separated by slight angling the impinging light beam 112. A PBS in place of the sheet polarizer allows separation of counter-propagating input and output light beams, or illumination light and image light in image systems, at normal i.e. perpendicular angles of incidence. Referring to FIG. 2 for an illustrative example, an optical switch 200 is similar to the optical switch 100 of FIG. 1, and includes same elements except for the sheet transmissive polarizer 104 is replaced with a PBS 204. In operation, the light beam 112 impinges onto a polarizing interface 205 of the PBS 204, which reflects the light polarized perpendicular to the plane of FIG. 2. When the LC layer 106 is in the undriven or low-voltage state, the light beam 112 acquires an approximately half-wave retardation upon double pass propagation through the LC layer 106, and becomes linearly polarized in plane of FIG. 2, just like in the optical switch 100 of FIG. 1. The light beam 112 (FIG. 2) is then transmitted through polarizing interface 205 forming the output beam 114. When the LC layer 106 is in the driven state, the polarization of the light beam 112 is preserved, causing the light beam 112 to be reflected back by the polarizing interface 205. Thus, the optical switch 200 operates in a drive-to-black configuration.

The optical switch 200 configuration of FIG. 2 may be employed in a liquid crystal-on-silicon (LCoS) image projector with a pixelated embodiment of the reflective LC device 102, which provides an image beam (i.e. the output beam 114) when illuminated with the light beam 112. The LCoS image projector may provide color images by providing the reflective LC device 102 with a color filter matrix, or by configuring a time-sequential illumination of the reflective LC device 102 to provide individual color channels of the displayed image in a time-sequential manner. It is further noted that the term "optical switch", as used herein, also includes visual displays and image projectors where the reflective LC device is pixelated to provide a spatially-varying light modulation for forming an image in linear domain to be displayed by the visual display/image projector.

Figure 3A:
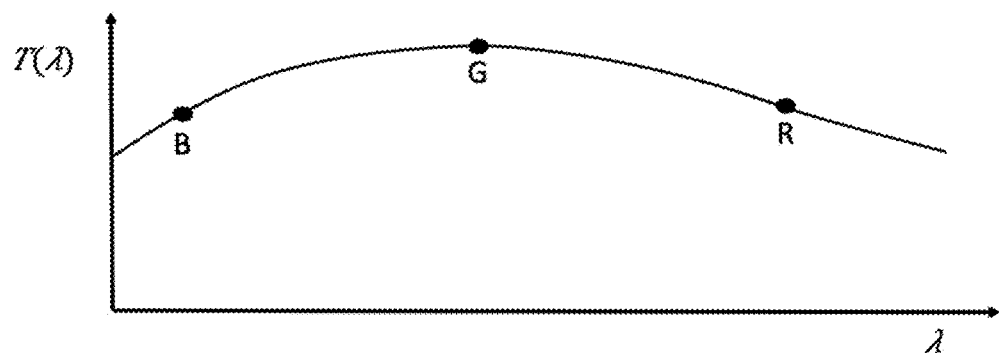
FIGS. 3A and 3B are spectral transmission graphs of the optical switch of FIG. 2 in a bright state (FIG. 3A) and in a dark state (FIG. 3B)

One disadvantage of the optical switch/display/projector configurations of FIG. 1 and FIG. 2 is a color-dependent performance. Referring for an illustrative example to FIGS. 3A-3B with further reference to FIG. 2, an optical throughput or double-pass light transmission through the optical switch 200 of FIG. 2 is plotted vs. wavelength for the undriven (low-voltage) and driven (high-voltage) states. In the undriven state illustrated in FIG. 3A, a double-pass spectral transmission $T(\lambda)$ of the optical switch 200 exhibits a strong wavelength dependence. This occurs because the optical retardation, in wavelength units, varies in going from blue light to green to red light due to a wavelength of blue light being only about 65% of a wavelength of red light. The single-pass optical retardation of the undriven state is optimized to be a quarter wavelength for the green light, which makes it over the quarter wavelength for the blue light having a shorter wavelength than the green light, and less than the quarter wavelength for the red light having a longer wavelength than the green light. Material dispersion also plays a role in the optical retardation being wavelength dependent, adding to the bell-shaped wavelength dependence $T(\lambda)$ shown in FIG. 3A.

Figure 3B:
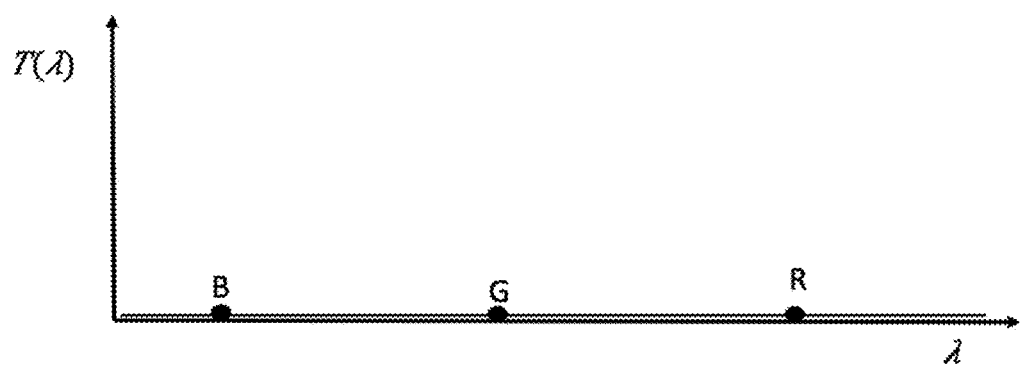

In the driven or high-voltage state illustrated in FIG. 3B, the double-pass spectral transmission $T(\lambda)$ of the optical switch 200 exhibits a low value for all three colors because in the high-voltage state, the LC director is mostly perpendicular to the plane of the LC layer 106, erasing most of the retardation. Accordingly, the high-voltage state of the optical switch 200 is more achromatic due to a near-zero optical retardation for all three colors. Any residual non-zero retardation due to thin near-electrode LC sub-layers, with the in-plane director substantially not impacted by the applied electric field, may be at least partially compensated for or offset by using one or several properly oriented retardation sheets in an optical path of the light beam 112. The black-level achromatic performance is usually more important than white-level achromatic performance because the black level performance impacts contrast or extinction ratio of an optical switch or display. Due to this, a drive-to-black configuration is more frequently used than a drive-to-white configuration. The drive-to-white configuration, e.g. the one presented in FIG. 1, will provide a more color-uniform white field than the drive-to-black configuration of FIG. 2, but the contrast will be quite low due to the inherent chromaticity of the undriven state of the LC layer 106.

Figure 4A:
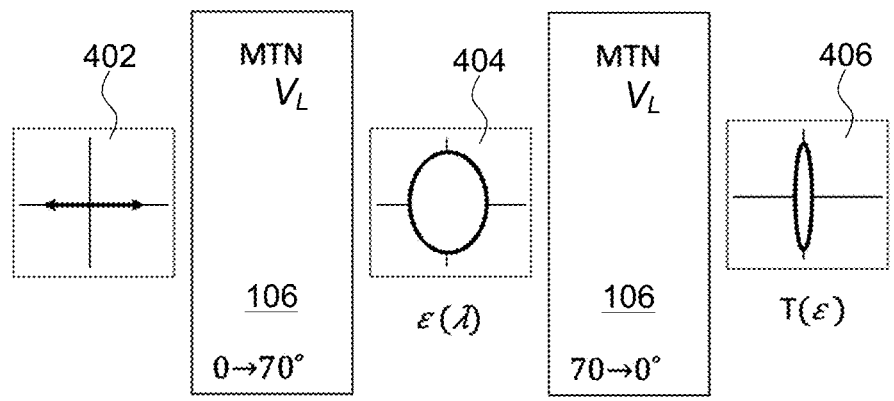
FIGS. 4A and 4B are polarization evolution diagrams for a light beam propagating in the optical switch of FIG. 2 in the bright state (FIG. 4A) and in the dark state (FIG. 4B) of the optical switch.
Figure 4B:
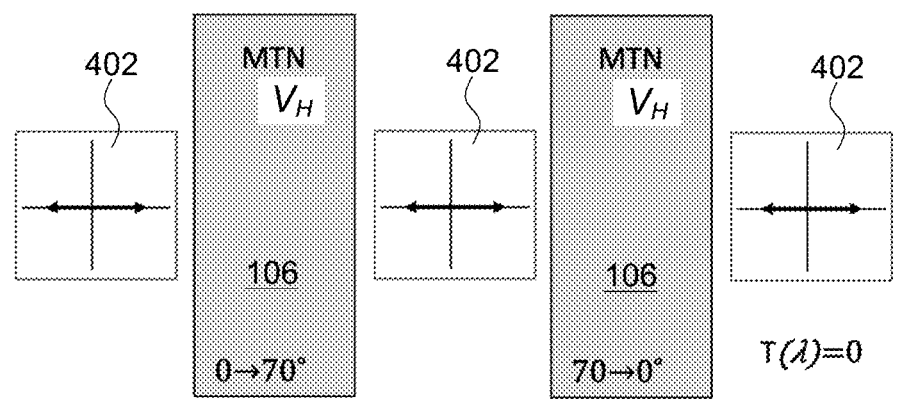

FIGS. 4A and 4B illustrate the origins of chromaticity of the optical switches 100 of FIGS. 1 and 200 of FIG. 2. FIG. 4A presents a polarization evolution diagram 400A for the undriven or low-voltage state $V_L$, where the LC director assumes the twisted configuration 110 (FIG. 2) at a twist angle of 70 degrees in this example. Such a configuration, as well as other configurations with twisted LC directors, is termed herein "mixed twisted nematic" or MTN. The impinging light beam 112 (FIG. 2) is horizontally polarized, as indicated at 402 (FIG. 4A). On the forward path, the light beam 112 propagates through the LC layer 106 through the 0° to 70° LC director angle, and acquires a first elliptical polarization denoted at 404, with ellipticity ε dependent on wavelength λ, $ε=ε(λ)$. On the reverse path, the light beam 112 propagates through the LC layer 106 through the 70° to 0° LC director angle of the LC layer 106, and acquires a second elliptical polarization denoted at 406, with the transmission T through the PBS 204 dependent on the ellipticity $ε(λ)$ and therefore dependent on the wavelength T $T(ε(λ))$ as noted above with reference to FIG. 3A.

Turning to FIG. 4B, a polarization evolution diagram 400B corresponds to the driven or high-voltage state $V_H$, with the LC director assumes a mostly vertical configuration. The residual birefringence due to boundary LC sublayers is neglected, or presumed compensated for. The impinging horizontally polarized light beam 112 propagates through the LC layer 106, keeping the original polarization state 402; gets reflected by the reflective electrode 107 (FIG. 2); and propagates back through the LC layer 106, keeping the original polarization state 402 because on the way back, the encountered retardation remains zero, ensuring achromatic dark-state performance illustrated in FIG. 3B.

The present disclosure aims to compensate the chromatic dispersion of a polarization transformation of impinging light in a low-voltage state of an MTN LC device, i.e. an LC device with a twisted nematic (TN) structure having a twist angle not limited to 90 degrees, in such a manner that the high-voltage state's achromaticity is not impacted, thus allowing both states of the polarization rotator to be achromatic. The following Properties A to E of retarder stacks operated in double-pass may be taken into account to facilitate the understanding of how a polarization rotator based on a reflective LC device may achieve achromatic performance in both low- and high-voltage states of a reflective LC device.

Property A. A double-pass structure, e.g. a retarder film stack and/or a (M) TN LC structure, can be unfolded and analyzed as an equivalent single-pass structure consisting of the forward-pass structure followed by the equivalent reverse-pass structure. The equivalent reverse-pass structure has a reverse-order (RO) symmetry with respect to the forward-pass structure, where the orientation angles of the layers in the stack are unchanged.

Property B. In stacks with RO symmetry, round-trip conversion from a first state of polarization (SOP) to the orthogonal SOP is accomplished using only retardation. For complete conversion, this requires a half-wave (HW) of retardation (at all wavelengths of interest) in a round-trip. More specifically, this requires accumulation of a quarter-wave (QW) of retardation in both the first-pass and the second-pass of the structure. To the extent that a linear input SOP becomes circular at the reflector (independent of the structural details of the stack), it is guaranteed that exiting light will have the orthogonal linear SOP.

Property C. For a linear input SOP, the full conversion between orthogonally polarized linear polarization states requires that the effective optic-axis of the half-wave retarder is at ±45° with respect to the input.

Property D. For stacks with RO symmetry, polarization rotation accumulated in the first pass is nullified in the second pass. This is a property of reciprocal systems. Accordingly, to the extent that a linear SOP remains linear at the reflector (irrespective of orientation), it is guaranteed that exiting light will retain the input linear SOP.

Property E. RO symmetry applies to both discrete structures, such as a retarder stack, and continuous phase-difference structures, such as active LC devices (TN, MTN, etc.) or passive reactive-mesogen coatings. A twisted LC director profile may be discretized into N uniaxial retarder slabs. For an LC device with a total in-plane retardation of $R_0 = Δnd/λ$, where Δn is the birefringence, d is the cell-gap, and λ is the wavelength, each homogeneous slab has retardation $R_0/N$. If the device has a twist angle β, each homogeneous slab has an orientation that is given by sampling the continuous director angle along the thickness direction $(α_1, α_2, α_3 \ldots α_N)$. According to RO symmetry, the second pass of the device therefore has effective orientation $(α_N \ldots α_3, α_2, α_1)$. A RO-symmetric retarder stack behaves virtually the same as the continuous counterpart for an appropriate number of slabs.

Figure 5:
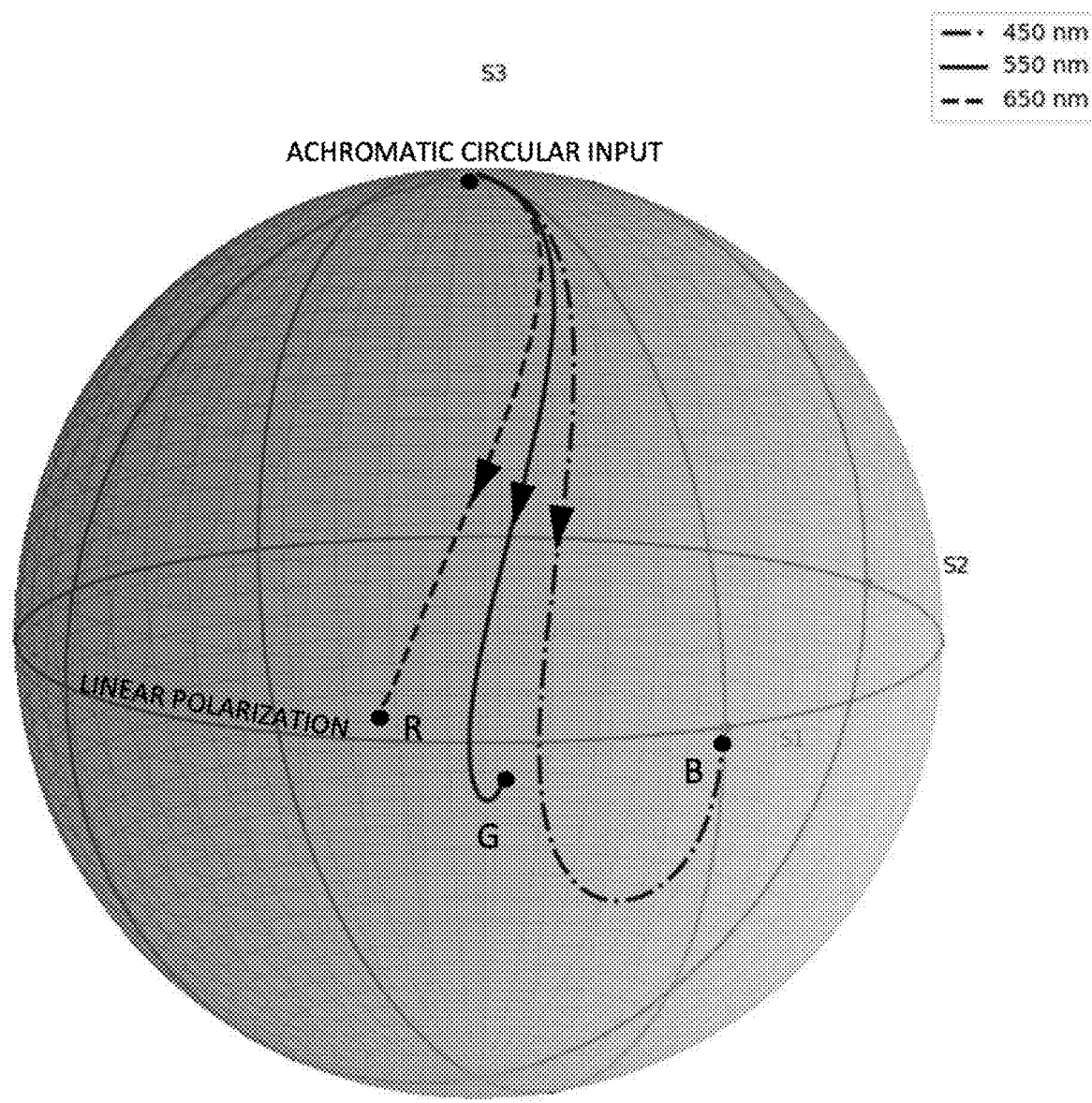
FIG. 5 is a Poincaré sphere view illustrating a polarization path of an achromatic circularly polarized light beam propagating through a TN LC polarization rotator.

A single-pass polarization transformation by an MTN LC cell will now be considered. FIG. 5 shows a Poincaré transformation of an MTN LC layer for red, green, and blue wavelengths, assuming an achromatic circularly polarized input impinging onto the LC layer. In the example of FIG. 5, the twist angle is 68°, and the retardation is 235 nm at a wavelength of 550 nm. This shows that a circularly polarized input ("Achromatic Circular Input") maps to a quasi-linearly polarized output ("Linear Polarization"), where the orientation of quasi-linear polarization is a function of wavelength, $θ(λ)$, being denoted as "R", "G", and "B" for red light at 650 nm, green light at 550 nm, and blue light at 450 nm respectively. The red light polarization path is shown with a dashed curved line, the green light polarization path is shown with a solid curve line, and the blue light polarization path is shown with a dash-dotted line.

The ellipticity field ratio and orientation of the linear polarization states for red, green, and blue light are given in Table 1 below. This also applies to the reverse transformation, where a quasi-linearly polarized input with wavelength-dependent orientation $θ(λ)$ maps to an achromatic circular SOP. Either way, this transformation represents approximately a quarter wave of retardation at each wavelength, i.e. it represents an embodiment of reverse dispersion. FIG. 5 also illustrates the deficiencies of a single MTN device, in that the SOP does not in general map between pole corresponding to a circular polarization, and equator corresponding to linear polarization of different orientations. Red is north of the equator meaning that the retardation is less than a quarter wave, and green is south of the equator meaning that the retardation is more than a quarter wave. While it does possess a measure of reverse-dispersion relative to a linear retarder, the MTN LC cell is not a perfect reverse-dispersion quarter-wave retarder over the visible band. This can be an important consideration when higher-order compensation is needed to maximize contrast, for example.

TABLE 1

Output of a single-pass and a double-pass of a reflective
MTN polarization rotator.

| Wavelength | Orientation (single pass) | Ellipticity (single pass) | Ellipticity (double pass) |
| --- | --- | --- | --- |
| Red (650 nm) | 21.0° | 0.038 | 0.854 |
| Green (550 nm) | 13.6° | 0.034 | 0.865 |
| Blue (450 nm) | 0.2° | 0.008 | 0.927 |

Figure 6:
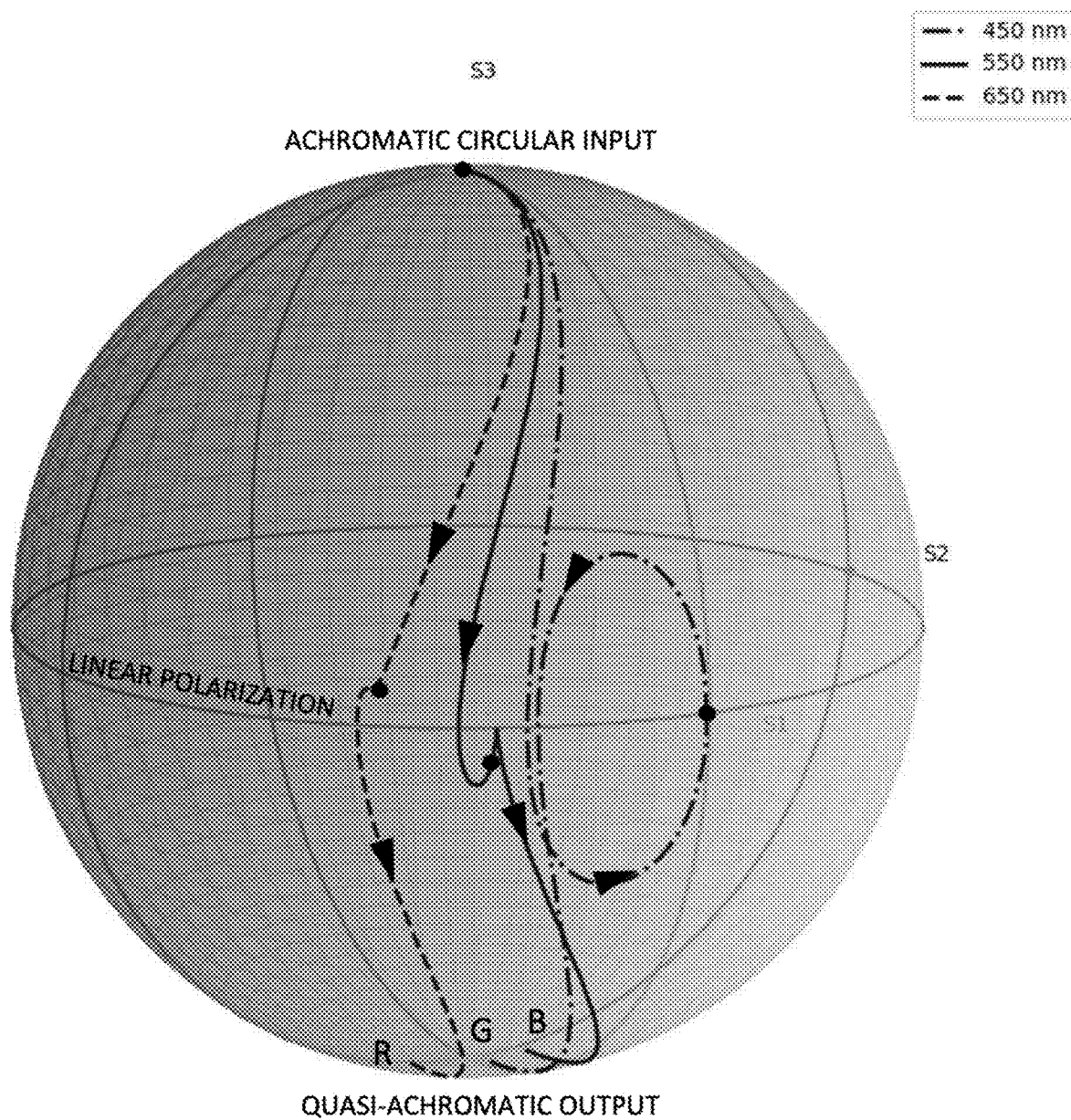
FIG. 6 is a Poincaré sphere view illustrating a polarization path of an achromatic circularly polarized light beam propagating through the TN LC polarization rotator, reflecting from the reflector, and propagating back through the TN LC polarization rotator.

FIG. 6 shows that a double pass through the MTN LC layer can create a handedness change of circularly polarized impinging light. In other words, the double-passed MTN LC layer may be functionally equivalent to an approximate half-wave retarder for a circularly polarized input. As in FIG. 5, the red light polarization path is shown in FIG. 6 with a dashed curved line, the green light polarization path is shown with a solid curve line, and the blue light polarization path is shown with a dash-dotted line. Wavelength dependence of rotation is the mechanism exploited by the MTN LC layer to force short-wavelength light (e.g. blue light) to travel a more tortuous path than long-wavelength light, as a means of compensating for the relatively long path length. As seen in FIG. 6, the deficiency of the MTN transformation in failing to map all wavelengths to the equator is exacerbated in the reverse pass. This is clear by observing the diversity of endpoints near the south pole of the Poincaré sphere of FIG. 6. The single-pass and double-pass SOP values for a light beam propagated through the MTN LC layer are summarized in Table 1 above. It is seen that overall, the double-pass performance of a MTN LC structure is not achromatic.

Figure 7A:
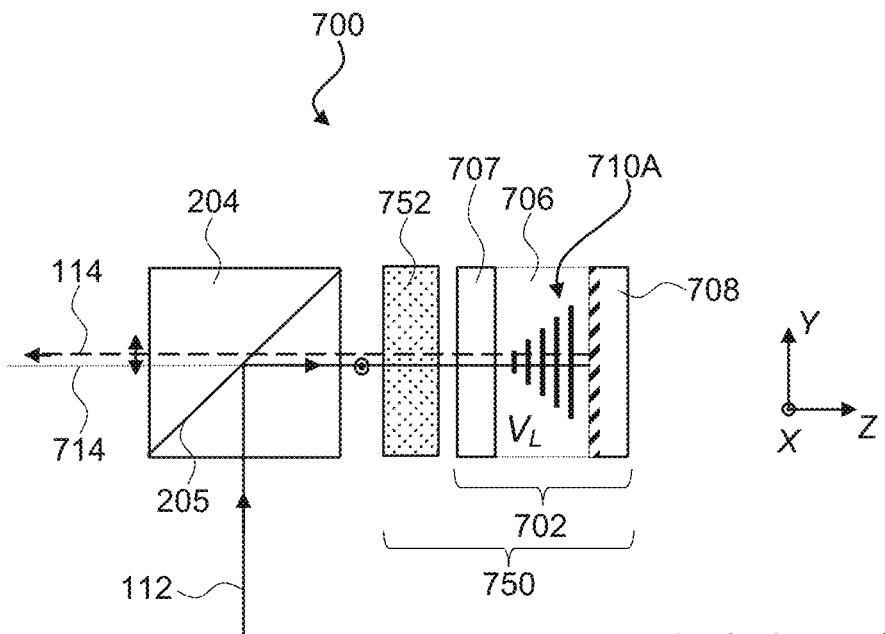
FIGS. 7A and 7B are schematic cross-sectional views of an optical switch based on a compensated polarization rotator of this disclosure in a bright state (FIG. 7A) and in a dark state (FIG. 7B) of the optical switch.
Figure 7B:
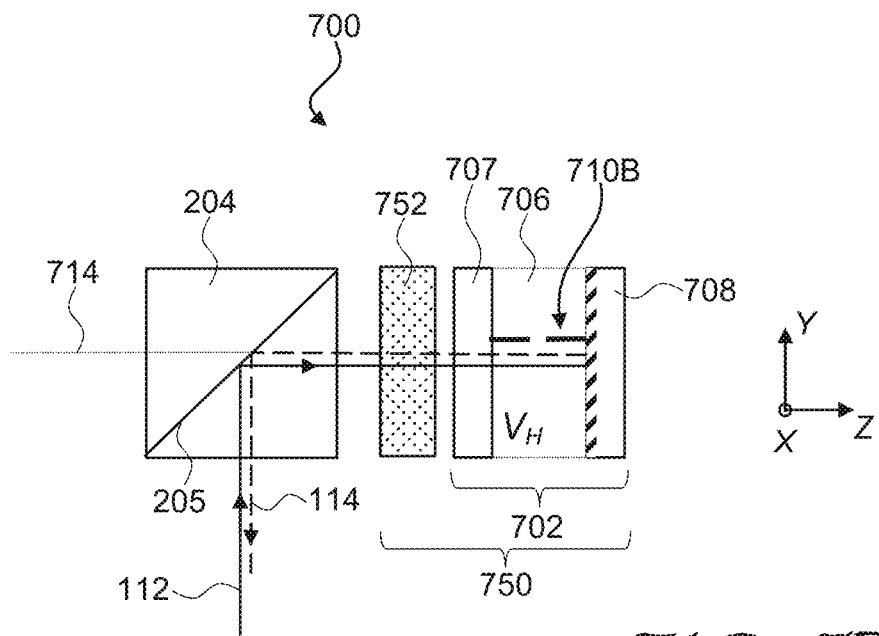

In accordance with this disclosure, a passive compensation structure (PCS) may be added to a reflective LC polarization rotator to offset the chromaticity of polarization transformation in the low-voltage state, e.g. the one illustrated in Table 1 above, without worsening the achromaticity of the high-voltage state. Referring to FIGS. 7A and 7B for a non-limiting illustrative example of such an achromatic polarization rotator, an optical switch 700 includes a polarization rotator 750 coupled to a PBS 204. The polarization rotator 750 includes a reflective LC device 702. The reflective LC device comprises an LC layer 706 coupled to a reflector 708. An electric field may be applied to the LC layer 706 by providing voltage between a transparent electrode 707 and the reflector 708. The reflector 708 may thus operate as the second electrode of the reflective LC device 702. The reflector 708 may be pixelated to provide spatially variant polarization rotation/switching of the impinging light beam 112, such that the LC layer 706 includes an array of individually controllable LC pixels. This turns the optical switch 700 into a visual display panel.

The LC layer 706 of the optical switch 700 is switchable between an undriven or low-voltage state having a twisted LC director configuration 710A (FIG. 7A), and a driven or high-voltage state having a substantially vertical LC director configuration 710B (FIG. 7B). Herein, the term "substantially", when applied to an LC director orientation, implies that the director angle of the LC layer 706 (i.e. a geometrical angle the director makes with the XY plane in FIGS. 7A, 7B) may deviate from 90 degrees by up to 10 degrees. The term "substantially" also implies that thin boundary sub-layers of the LC layer 706, i.e. submicron-thickness sub-layers next to alignment layers defining the boundary LC molecules orientation of the LC layer 706 may have a non-vertical alignment due to a stronger interaction with the alignment layers bordering the LC layer 706 than the electric field applied to the LC layer 706. The twisted LC director configuration 710A may have a twist angle of less than 90 degrees in some embodiments.

When in the low-voltage or undriven state (FIG. 7A), the LC layer 706 converts, on a single pass of the light beam 112 through the LC layer 706, a first achromatic polarization state of the light beam 112 into a first wavelength distribution of polarization states. For example, in FIG. 5 considered above, the first achromatic state is a circular achromatic polarization state at the top of Poincaré sphere denoted as "Achromatic Circular Input", and the first wavelength distribution of polarization states is a distribution of quasi-linear polarization states around the equator of the Poincaré sphere denoted as "Linear Polarization" at black dots "R", "G", and "B" in FIG. 5. The polarization rotator 750 (FIG. 7A) further includes a PCS 752 disposed upstream of the reflective LC device 702 w.r.t. the impinging light beam 112. The PCS 752 us configured to convert, on a single pass of the light beam 112, a second achromatic polarization state of the light beam 112 into a second wavelength distribution of polarization states matching the first wavelength distribution. The purpose of the matching is to compensate for the chromaticity of the LC layer 706 in the undriven state, as will be explained in more detail below. The second achromatic polarization state may be e.g. a linear achromatic polarization state.

Figure 8A:
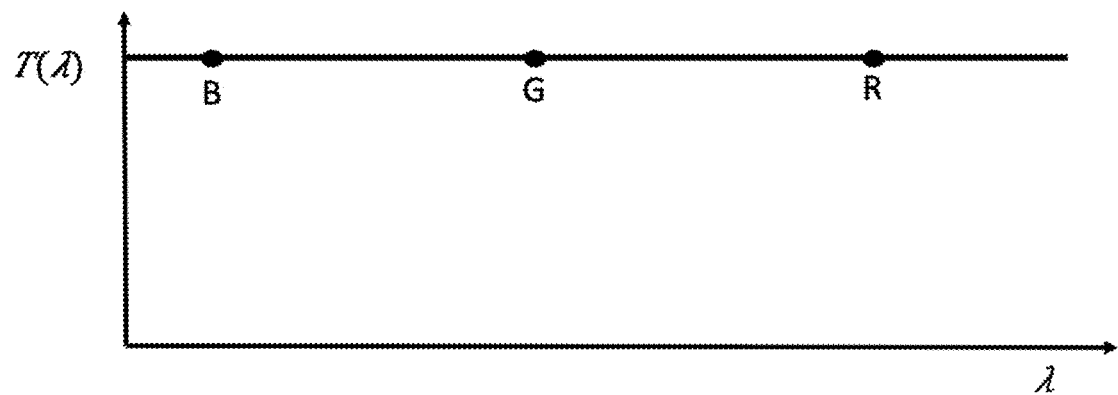
FIGS. 8A and 8B are spectral transmission graphs of the optical switch of FIGS. 7A-7B in the bright state (FIG. 8A, corresponds to FIG. 7A) and in the dark state (FIG. 8B, corresponds to FIG. 7B)

In operation, the impinging light beam 112 gets polarized along X-axis by reflection from the polarizing interface 205 of the PBS 204. The linearly X-polarized light beam 112 propagates through the PCS 752 which, according to the reciprocity principle (Property D stated above), creates the second wavelength distribution of polarization states from the achromatic linear polarization state. Then, the light beam 112 propagates through the LC layer 706. Since the second wavelength distribution of polarization states closely matches the first wavelength distribution of polarization states, the polarization state of the light beam 112 propagated through the LC layer 706, i.e. at the reflector 708, will be very close to an achromatic circular polarization state. Therefore, according to the Property B stated above for structures with RO symmetry, to the extent that the linear input polarization state becomes circular at the reflector 708, it is guaranteed that the output light beam 114 will have the orthogonal linear polarization state across the entire wavelength band of the light beam 112, causing the output light beam 114 to propagate through the PBS 204 along an output optical path 714. Thus, the polarization rotator 750 converts between orthogonal achromatic polarization states of the light beam 112 propagated through the PCS 752, the LC layer 706, reflected by the reflector 708, and propagated back through the LC layer 706 and the PCS 752, when the LC layer 706 is in the low-voltage or undriven state. In the undriven state, the polarization rotator 750 of the optical switch 700 exhibits achromatic behavior, as illustrated in FIG. 8A.

Figure 8B:
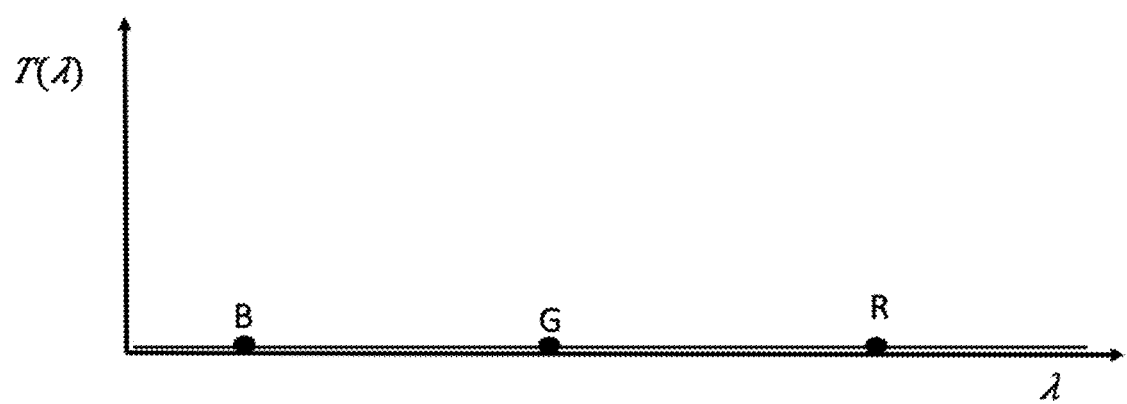

When in the high-voltage or driven state (FIG. 7B), the LC layer 706 exhibits substantially no in-plane retardation and, therefore, preserves the second wavelength distribution of polarization states. According to Property D above for stacks with RO symmetry, polarization rotation accumulated in the first pass is nullified in the second pass for all colors, causing the output light beam 114 to have substantially the same polarization state as the impinging light beam 112 and therefore reflect from the polarizing interface 205, such that substantially no light propagates along the output optical path 714. Therefore, the polarization rotator 750 preserves, at its output, an achromatic polarization state of the light beam 112 impinging onto the polarization rotator 750. In other words, in the undriven state, the polarization rotator 750 of the optical switch 700 also exhibits achromatic behavior, as illustrated in FIG. 8B.

To summarize, in the undriven state of the LC layer 706, the PCS 752 transforms the achromatic linear input to a wavelength-dispersed linear state, preconditioning the SOP for modulation by the undriven MTN LC layer 706. Using data from e.g. the Poincaré sphere mapping of FIG. 5, the appropriate θ(λ) is input to the undriven MTN LC layer 706 such that the ellipticity field ratio at the reflector 708 is as close to unity as possible (i.e. as close as possible to circular polarization) for the wavelength range of interest, e.g. between 450 nm and 700 nm. This creates a flat spectral response when analyzed by the PBS 204 after the double pass. In the driven state of the LC layer 706, and to the extent that the energized LC layer 706 has zero in-plane retardation, the PCS 752 provides a rotated linear SOP at the reflector 708, which retains a linear SOP after a round-trip due to properties of RO systems outlined above.

In practice, the PCS 752 may incorporate additional compensation to account for residual retardation from the LC layer 706 for the purpose of maximizing contrast. Alternatively, the PCS 752 and LC layer 706 compensation can be modular, such that the PCS maps an achromatic linear SOP to a wavelength-dispersed linear SOP. The compensation between the PCS 752 and the reflective LC device 702 removes residual retardation from the fully energized LC layer 706. To the extent that the compensated polarization rotator 750 behaves as a simple mirror (i.e. has a zero composite retardation), the optimized PCS 752 ideally produces linear SOP at all wavelengths of interest.

Figure 9A:
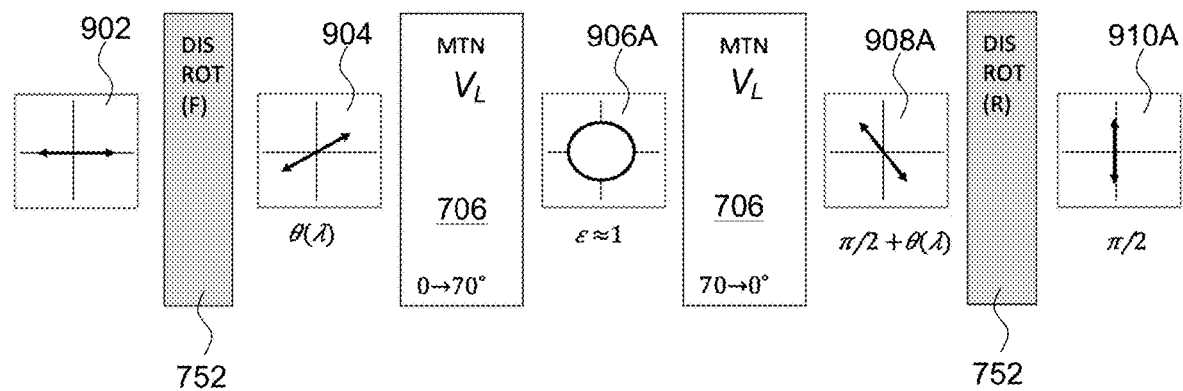
FIGS. 9A and 9B are polarization evolution diagrams of the compensated optical switch in the bright state (FIG. 9A) and in the dark state (FIG. 9B) of the optical switch.
Figure 9B:
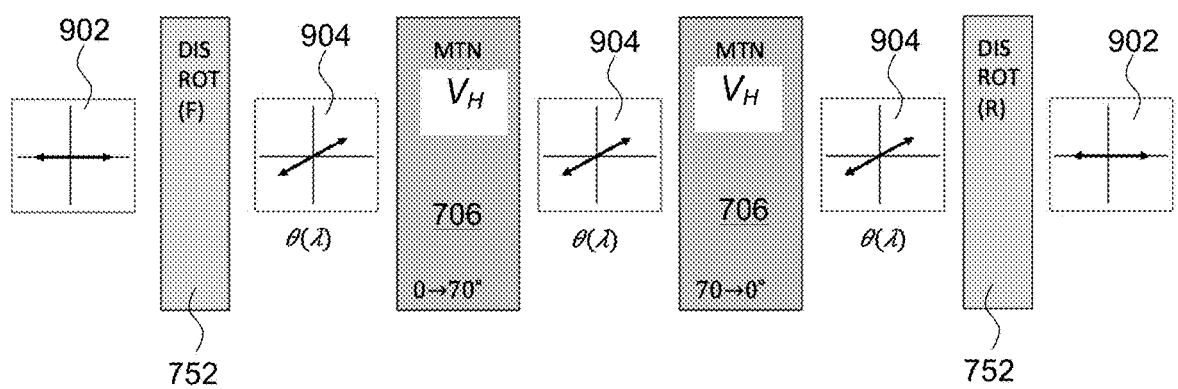

FIGS. 9A and 9B further illustrate the polarization transformation by the polarization rotator 750 of FIGS. 7A and 7B in the low-voltage $V_L$ (FIG. 9A) and high-voltage $V_H$ (FIG. 9B) states, respectively, of the LC layer 706. FIG. 9A presents a diagram 900A of the SOP evolution along an unfolded optical path of the light beam 112 through the polarization rotator 750 (FIG. 7A), where the LC layer 706 is in the low-voltage state characterized by the twisted director configuration 710A. The twist angle of the non-energized (low-voltage state) LC layer 706 is 70 degrees in this example. The impinging light beam 112 is horizontally polarized, as indicated at 902 (FIG. 9A). The PCS 752 operates as a dispersive rotator mapping the achromatic linear polarization input to an appropriate wavelength-dispersed linear SOP, θ(λ) as denoted at 904, e.g. to account for polarization transformations by a non-energized LC layer presented in FIG. 5. The PCS 752 "anticipates" the orientation needed at each wavelength, providing a non-achromatic linear polarization state of the light beam 112 impinging onto the LC layer 706 for the SOP at the reflector 708 to be as close to a circular polarization as possible.

If the combination of the PCS 752 and the reflective LC device 702 produces the near-circular polarization (ellipticity ε≈1) at the reflector 708 as denoted at 906A, the polarization rotator 750 behaves as an achromatic half-wave retarder in double-pass, per RO symmetry discussed above. The LC layer 706 will convert the polarization of the reverse-propagating light beam 112 to an orthogonal linear polarization for each wavelength as denoted at 908A, which will be converted to a vertical linear polarization denoted at 910A. Thus, when the LC layer 706 is in the undriven state, the polarization rotator 750 converts between orthogonal achromatic polarization states of the light beam 112.

FIG. 9B shows a diagram 900B of the SOP evolution along the same structure, i.e. the polarization rotator 750 of FIG. 7B, with the LC layer 706 in the fully energized or driven state. At sufficient voltage, the in-plane transformation from the LC layer 706 is small, and its effect on the bright-state transmission may be negligible. As noted previously, rotation incurred in the forward pass is nullified in the reverse pass. The initial SOP 902 is converted to the wavelength-dispersed SPO 904, which is preserved through the light path until the reverse pass makes it back to the initial SOP 902. Therefore, the initial SOP 902 remains the same after a round-trip, and the driven state is also achromatic. In other words, the polarization rotator 750 preserves the achromatic polarization state of the light beam 112. It is to be noted that in configurations considered herein, a dispersive rotator achromatizes the polarization transformation by an MTN LC cell in the low-voltage state without compromising the polarization transformation in the high-voltage state. To a first approximation, the PCS 752 is used to transform an achromatic linear input to a wavelength-dispersed or wavelength-dependent linear SOP. The PCS 752 may also incorporate compensating elements for reduction of residual incremental ellipticity as needed to meet a required specification, e.g. to maximize contrast.

Figure 10:
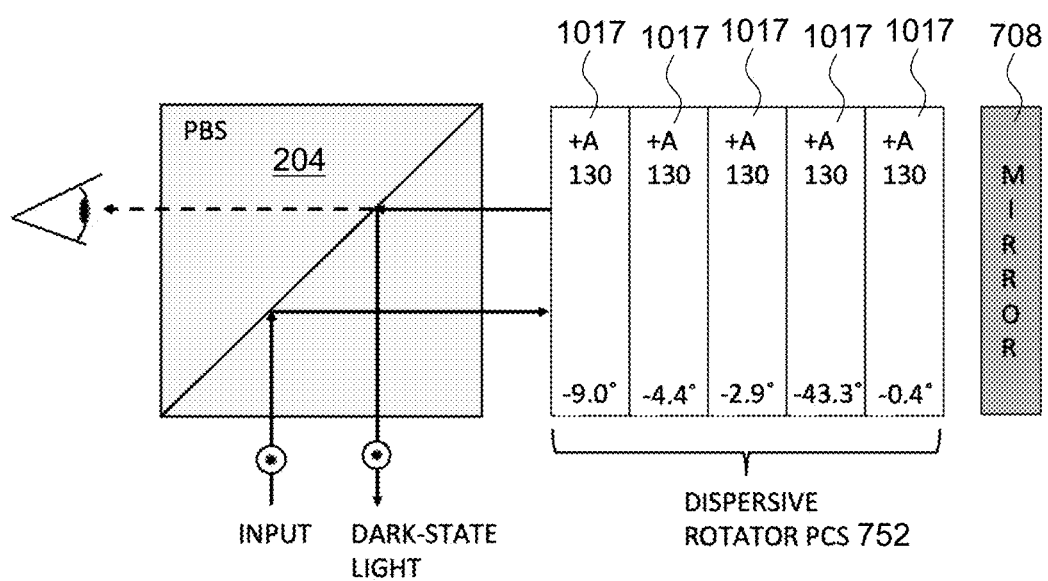
FIG. 10 is a schematic cross-sectional view of an equivalent configuration of the compensated optical switch of FIG. 7B in the dark (i.e. driven) state.

Referring to FIG. 10, an example structure of the PCS or dispersive rotator 752 is explicitly illustrated in an equivalent configuration of the optical switch 700 of FIG. 7B in the driven state. It is assumed that the LC layer 706 in the driven state is has no residual in-plane birefringence, or such in-plane birefringence is fully compensated, so the LC layer 706 is not shown in FIG. 10. The PCS 752 includes a stack of five fixed-retardation layers 1017 having a same in-plane retardation of 130 nm at the wavelength of 520 nm but differing optic axis orientations of −9.0°, −4.4°, −2.9°, −43.3°, and −0.4°. The birefringence dispersion of cyclic olefin polymer is assumed.

Cyclic olefin polymer is one non-limiting example material of the fixed-retardation layers 1017. Many other materials and configurations may be used to construct the stack of the PCS 752. Generally, the PCS 752 can include any technology that transforms an input SOP to a desired output SOP, including +A-Plates or positive in-plane birefringence plates, −A-plates or negative in-plane birefringence plates, etc. Meeting tolerance constraints for polarization transformations at each wavelength may require two to ten (or more) birefringent layers, including non-twisted or linear retarders, such as stretched-polymers and cross linked reactive-mesogen liquid-crystal polymer stacks. The latter can also form twisted birefringent layers. Stretched polymers can be cut at the appropriate angles relative to the stretching direction, and laminated together using pressure-sensitive-adhesives, or solvent lamination. Reactive-mesogen stacks can be formed in a similar manner via transfer from a web-based coating, or by direct coating stacks using (e.g.) UV alignment. The composite transformation of the stack represents an engineered dispersion, in that the end points (ellipticity and orientation) are determined by the sequence of transformations that each wavelength undergoes.

Table 2 below shows the SOP at the reflector 708 for select wavelengths, as well as the transmission leakage at the output port (i.e. at the output optical path 714) in double pass. The PCS output angle, θ(λ), may be extracted by inputting achromatic circular polarization into the specific MTN LC cell and noting the orientation of the major axis of the ellipse at each wavelength of interest. The PCS may then be configured to transform the input achromatic linear input to produce this polarization orientation distribution.

TABLE 2

PCS performance for a linear to dispersed-linear polarization distribution.

| Wavelength (nm) | PCS Single Pass $\bar{\epsilon}$ | PCS Output Angle (deg) | Double-Pass Transmission Parallel-Pol (%) |
|---|---|---|---|
| 400 | −0.09 | −60.1 | 3.1 |
| 450 | −0.02 | −46.7 | 0.2 |
| 500 | 0.01 | −37.6 | 0.05 |
| 550 | 0.01 | −31.8 | 0.08 |
| 600 | 0.01 | −28.5 | 0.02 |
| 650 | 0.00 | −26.9 | 0.00 |
| 700 | 0.00 | −26.2 | 0.00 |

One can see from Table 2 that the double-pass transmission provides a high suppression in the dark state and a nearly-achromatic contrast ratio across at least the wavelength range of 450 nm to 700 nm—the result of the polarization rotator 750 converting between orthogonal achromatic polarization states of the light beam 112 in the undriven state of the LC layer 706, and preserving the achromatic polarization state of the light beam 112 in the driven state of LC layer 706, in the above stated wavelength range of 450 nm to 700 nm.

Figure 11:
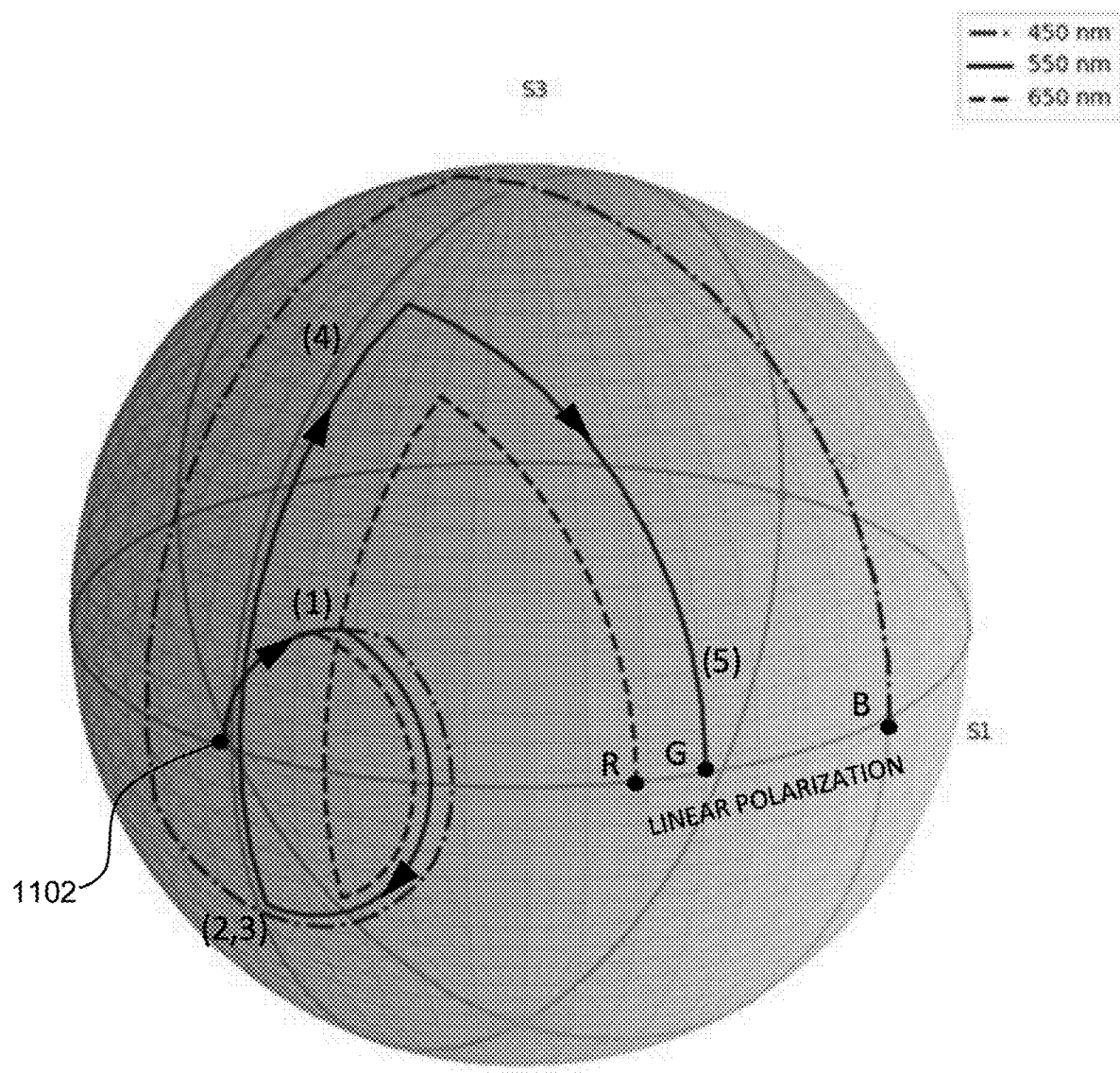
FIG. 11 is a Poincaré sphere view illustrating a polarization path of an achromatic linearly polarized light beam propagating through a passive compensation structure (PCS) of the compensated optical switch of FIGS. 7A-7B.

FIG. 11 shows a Poincaré-sphere mapping for the PCS configuration of FIG. 10. The sequence of transformations maps red (dashed lines), green (solid lines), and blue (dash-dot lines) wavelengths from a common linear polarization state 1102 to the low-ellipticity states with rotation angles shown in Table 2. The low-ellipticity states are denoted in FIG. 11 with "R", "G", and "B" to refer to the polarization states of red, green, and blue light respectively. The numbers in parentheses (1), (2,3), (4), and (5) refer to a sequential number of the retardation layers 1017 in the stack of the PCS 752 in going from left to right.

A global optimization algorithm may be used to identify a retarder stack with the best performance. For example, the optimization criteria may be based on leakage of the orthogonal polarization averaged over angle of incidence (e.g.) 0°-30°, azimuth angle) (0°-360°, and wavelength (e.g. 440 nm to 650 nm). The optimization procedure may use a sparse set of wavelengths (e.g. 450 nm, 550 nm and 650 nm) covering the range. For each wavelength and incidence angle, the leakage power oriented along $\theta(\lambda)+\pi/2$ can be calculated. Configurations that minimize global leakage over the range of wavelengths and incidence angles may possess an intrinsic low composite retardation in the thickness direction ($R_{th}$), even though the stack may be composed of uniaxial materials (each of which has a non-zero $R_{th}$). Thickness-direction retardation can become significant at off-normal angles of incidence, corrupting the normal-incidence transformation, as discussed further below.

An aspect of the present disclosure is that it can enable displays to have high contrast in a normally-dark configuration while benefitting from achromaticity of the white driven state. Referring for a non-limiting illustrative example to FIGS. 12A and 12B, an optical switch 1200 includes a sheet polarizer 1204, or a transmission polarizer, coupled to a polarization rotator 1250. The latter includes a PCS stack 1252 optically coupled to a reflective LC device 1202 including an LC layer 1206 coupled to a reflector 1208 among other layers, which have been omitted for brevity. The LC layer 1206 has a twisted LC director configuration in the undriven state with the twist angle of 68 degrees, varying from the orientation of 90 degrees at one side of the LC layer 1206 to 158 degrees at the other side of the LC layer 1206. The PCS stack 1252 includes five in-plane fixed retarders 1217 having a zero thickness retardation ("$0R_{th}$") and 130 nm in-plane retardation at a wavelength of green light directed at 71.7°, 73.4°, −12.5°, 38.3°, and 74.3° in going from left to right in FIGS. 12A and 12B. The sheet polarizer 1204 has an orientation at −47.2°. The purpose of the PCS stack 1252 is to compensate or offset the low-voltage chromaticity of polarization rotation by the reflective LC device 1202 as explained above.

Figure 12A:
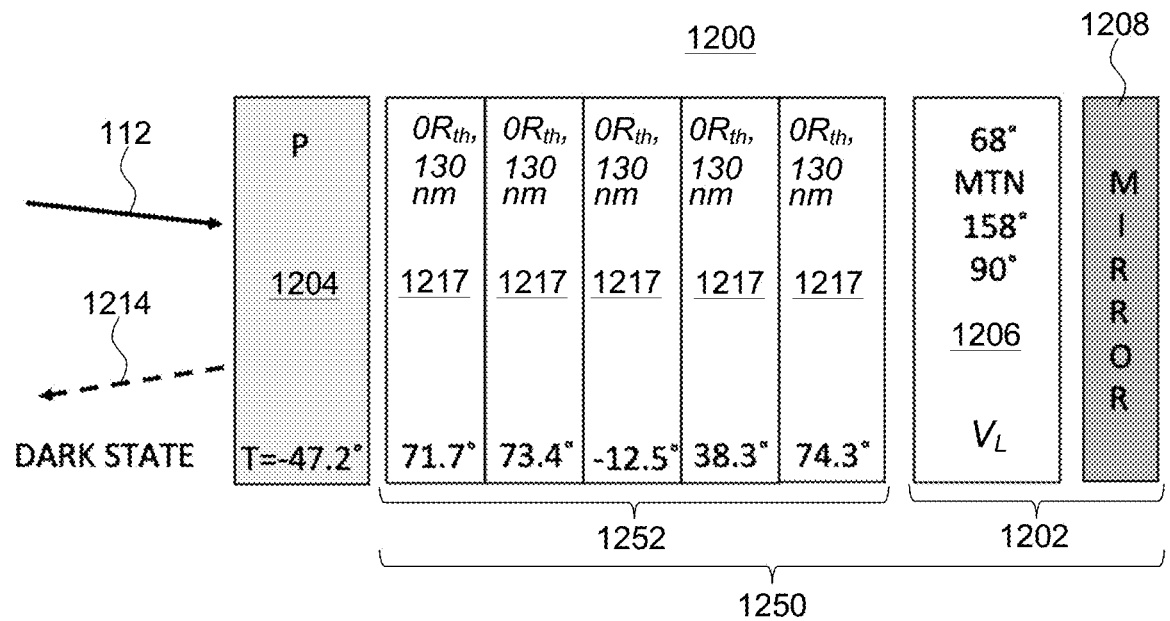
FIGS. 12A and 12B are schematic cross-sectional views of an example compensated optical switch of this disclosure including a sheet polarizer, in a dark state (FIG. 12A) and in a bright state (FIG. 12B) of the optical switch.

In the dark state depicted in FIG. 12A, the LC layer 1206 is in the low-voltage state $V_L$. The impinging light beam 112 gets linearly polarized by the sheet polarizer 1204, propagates through the PCS stack 1252 which pre-conditions the input polarization for the LC device 1202, propagates through the LC cell 1206 and becomes circularly polarized. On the reverse path, the light beam 112 acquires an orthogonal linear polarization and is blocked from propagating along an output light bath 1214. The PCS stack 1252 ensures that the dark state of FIG. 12A is achromatic.

Figure 12B:
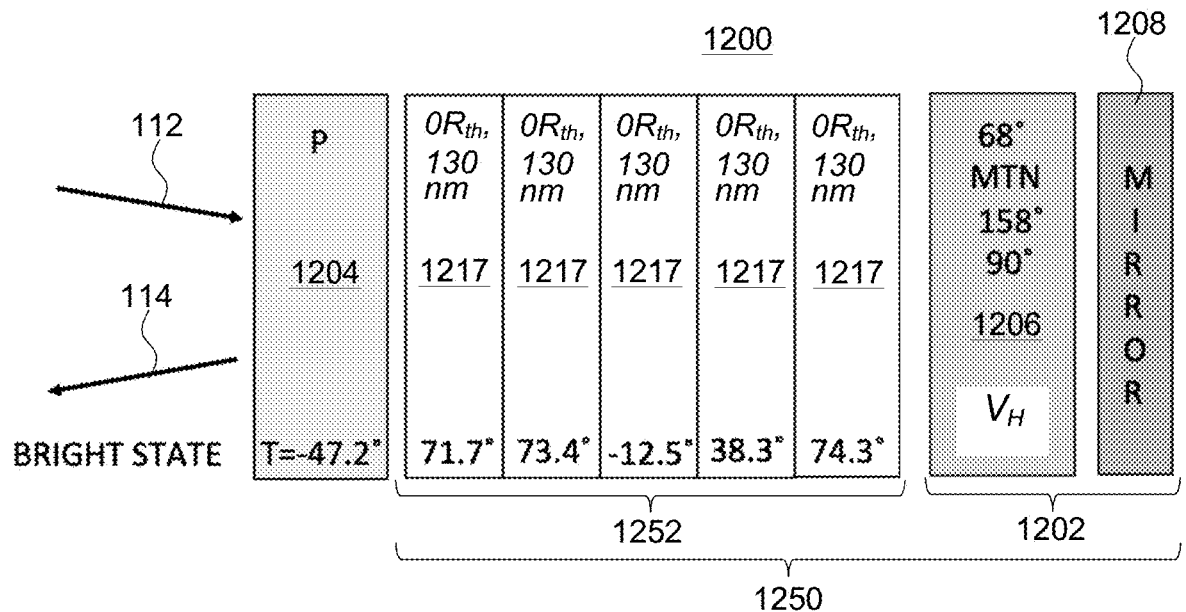

In the bright state depicted in FIG. 12B, the LC layer 1206 is in the high-voltage state $V_H$. The impinging light beam 112 gets linearly polarized by the sheet polarizer 1204, propagates through the PCS stack 1252 which pre-conditions the input polarization for the LC device 1202 and becomes linearly polarized with the polarization angle depending on wavelength. The light beam 112 propagates through the LC layer 1206, which substantially does not change the polarization due to being in the driven or high-voltage state. On the reverse path, the light beam 112 retraces its polarization back to the original state, and is out-coupled as the output light beam 114. The white state of FIG. 12B is also achromatic due to the RO symmetry of the PCS stack 1252 and the LC device 1202.

The combination of the PCS stack 1252 with the MTN configuration of the LC layer 1206 in the undriven state delivers nearly circular polarization of the light beam 112 at the reflector 1208 over the visible wavelength range. The PCS stack 1252 is configured to deliver the optimum polarization orientation to the LC layer 1206 at each wavelength, as well as to compensate for residual ellipticity associated with the MTN geometry illustrated in FIG. 5. The latter can be a great benefit to the contrast ratio, while having little impact on throughput of the bright state. The PCS stack 1252 may be optimized for normal angle of incidence. The latter could also be considered the optimum case for a PCS that uses base retarders with zero thickness direction retardation ($0R_{th}$), where performance is virtually unaffected by incidence angle.

Table 3 illustrates the performance of the optical switch 1200.

TABLE 3

MTN LC cell and PCS stack behavior for a normally-dark optical switch.

| Wavelength (nm) | MTN Single Pass $\varepsilon$ | Double-Pass Transmission Parallel-Pol (%) | PCS Output Angle (deg) | PCS Output $\varepsilon$ | PCS/MTN Single Pass $\varepsilon$ | Non-energized Double-Pass Transmission (%) | Energized Double-Pass Transmission (%) |
|---|---|---|---|---|---|---|---|
| 400 | 0.40 | 51.37 | −54.93 | 0.06 | 0.85 | 2.75 | 98.4 |
| 450 | 0.61 | 19.53 | −45.52 | −0.01 | 0.98 | 0.03 | 99.8 |
| 500 | 0.80 | 4.30 | −37.79 | −0.04 | 0.99 | 0.01 | 99.4 |
| 550 | 0.93 | 0.57 | −31.89 | −0.04 | 1.00 | 0.00 | 99.5 |
| 600 | 0.86 | 2.92 | −27.65 | −0.01 | 0.99 | 0.00 | 99.9 |
| 650 | 0.76 | 8.21 | −24.81 | 0.03 | 0.98 | 0.03 | 99.3 |
| 700 | 0.68 | 14.47 | −23.06 | 0.07 | 0.96 | 0.14 | 99.7 |

For benchmarking purposes, column 2 of Table 3 shows the single-pass ellipticity field ratio for the MTN LC layer 1206 with a uniform linear input polarization. The configuration of the optical switch 1200 depicted in FIGS. 12A and 12B optimizes the circular polarization (i.e. maximizes $\varepsilon(\lambda)$) at 550 nm, though it remains below unity due to conversion efficiency limitations of an MTN LC cell configuration. Clearly, ellipticity is a strong function of wavelength, which results in rapid increase in double-pass parallel-polarizer leakage (column 3). Columns 4 and 5 show the output orientation and ellipticity from the PCS for a uniform linear polarization input, respectively. The latter effectively counteracts the ellipticity introduced by the MTN configuration. Column 6 shows the ellipticity at the reflector 1208 for the combined action of the PCS and the MTN, showing nearly circular polarization for the entire visible wavelength band. Column 7 shows the double-pass leakage, where the contrast ratio is the inverse of the leakage. This verifies that a PCS, matched to an MTN LC cell, can deliver contrast ratios in a parallel polarizer configuration that are acceptable for most display product requirements. Column 8 verifies that the double-pass transmission is nearly lossless when the MTN LC cell is fully energized. In practice (e.g. with an LCoS display panel), voltage limitations can reduce the modulation depth, though it is important to note that the PCS and achromatic QW retardation of the MTN device in principle enables nearly perfect achromatic switching over the entire visible wavelength band.

In practice, the contrast ratio of a normally-dark optical switch or visual display is a strong function of the matching between the PCS and the MTN LC device. Manufacturing uncertainty in MTN cell gap and PCS behavior can create a mismatch between the elements, reducing contrast. Given the tight tolerance on retardation and slow axis orientation of typical (e.g. Zeon retardation film manufactured by Zeon Specialty Materials Inc., California, USA) stretched polymer retarders, MTN cell gap uncertainty tends to dominate this mismatch. This includes spatially uniform cell gap uncertainty (e.g. part-to-part or wafer-to-wafer), as well as intra-part spatial non-uniformity due to factors like internal stress and bowing of the silicon chip. Intra-part non-uniformity can also be a function of temperature.

Figure 13:
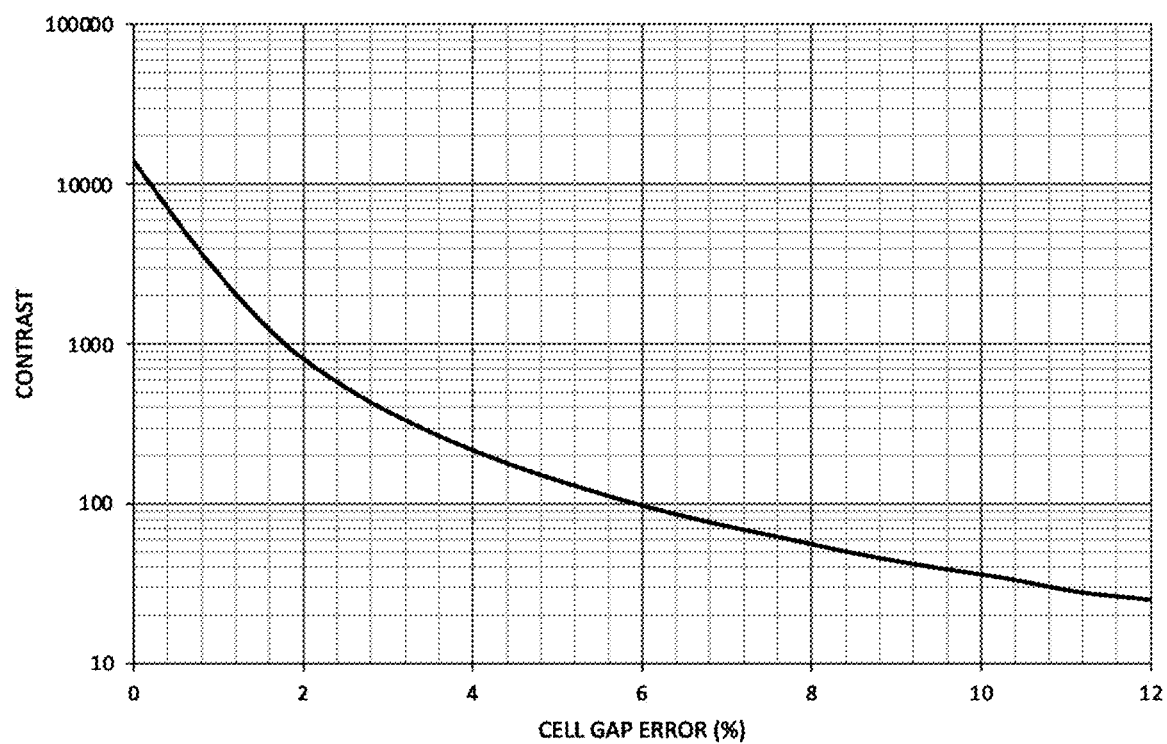
FIG. 13 is a graph of a contrast ratio vs. cell gap error in the compensated optical switch with a zero-voltage undriven state.
Figure 14:
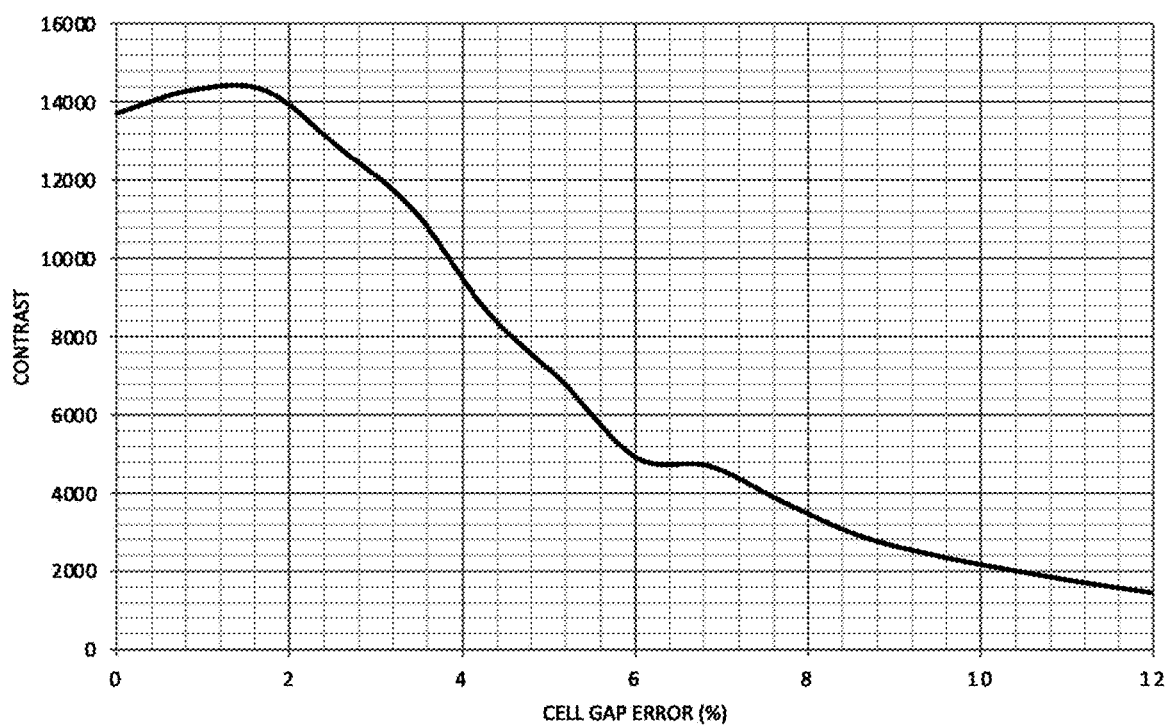
FIG. 14 is a graph of a maximum contrast vs. a cell gap error in the compensated optical switch with a non-zero-voltage undriven state, for comparison with FIG. 13.

FIG. 13 illustrates that it takes only a 6% increase in cell gap (relative to the optimum) for the contrast to fall from 14,000:1 to below 100:1, which is not practical. A method to overcome this is to slightly increase the cell gap, relative to the optimum, and then to apply a small voltage to actively minimize dark-state leakage. In other words, a non-zero voltage may be applied to the LC layer in the undriven state to better match the LC layer wavelength distribution of polarization states to the PCS wavelength distribution of polarization states, as compared to a match of the LC and PCS wavelength distributions when a zero voltage is applied to the LC layer. Referring to FIG. 14 for example, the contrast ratio versus cell gap nonuniformity with the optimum voltage applied. While the contrast declines, it remains above 1,000:1 for over a 12% error in cell gap. This tolerance is within reach for LCoS panel manufacturing. For pixelated optical switches/visual display panels, a spatially varying voltage correction may also be applied to account for deterministic spatial non uniformity in cell gap.

In most projection and direct-view display systems, normal-incidence performance must be maintained over a significant illumination/viewing cone angle. In general, modulation of an in-plane retardation is coupled with a modulation of the thickness-direction retardation. When optimizing for contrast over the field-of-view (FOV), the dark state is compensated at the expense of tolerating angular non-uniformity of the bright state. The behavior of a nematic LC device may be described in terms of the in-plane distribution of the LC director and the thickness-direction distribution of the LC director. The former determines the functional polarization transformation near normal angle of incidence, while the latter can introduce distortion in the transformation as the incidence angle grows. In a reflection-mode optical switch or display, the LC may be operated in an analog or digital addressing mode. At the extremes of electric field amplitude, an MTN LC device may provide a maximum in-plane functionality, e.g. a quarter-wave retardation, and a minimum in-plane functionality, e.g. a zero in-plane retardation.

For a normally bright configuration of a polarization rotator, optical switch, and/or visual display of this disclosure, the dark-state leakage may be determined by the non-zero ellipticity at the mirror. Near normal incidence, e.g. <12° angle of incidence (AOI), the associated leakage may be given by the residual in-plane retardation of the compensated MTN LC panel in the fully energized state. For a normally-dark configuration, the contrast may be determined by the non-unity ellipticity at the mirror. This may be determined by the quality of the match between the PCS and the MTN devices in the low-voltage state. As noted previously, this match may account for both the optimum input orientation and ellipticity input to the MTN to deliver circular polarization at the mirror.

At the extreme electric field amplitudes, LC devices of this disclosure may have director fields that are substantially in-plane in the functional (non-energized or low-voltage) state, and substantially normal to the device in the alternate (e.g. fully energized) state. In practice, the extent of the oblique director tilt near the boundary is preferably minimized by using low pretilt alignment layers, and by operating the LC cell at a sufficiently high voltage.

In an idealized condition, an entirely in-plane MTN director field produces a transformation in the functional state that maps all wavelengths to a circular SOP. Assuming a uniaxial LC, the cell can be described as having an in-plane retardation of $$R_e = R_0 = (n_x - n_y)d = (n_e - n_o)d = \Delta n d \tag{1}$$

where $n_e$ is the extraordinary refractive index, $n_o$ is the ordinary refractive index, d is the cell gap, and $\Delta n$ is the wavelength-dependent birefringence. This is the total retardation (or path length difference) of the LC, though the director field of an MTN has a twisted arrangement. For an LC with zero twist angle, it can be considered as an A-Plate. An A-Plate also has a thickness-direction retardation given by $$R_{th} = \left[\left(\frac{n_x + n_y}{2}\right) - n_z\right]d = R_0/2 \tag{2}$$

In practice, non-zero $R_{th}$ tends to limit the performance of the LC device as the incidence angle increases relative to normal. Were $R_{th}$ instead zero, the in-plane functionality of the LC device could be substantially preserved with incidence angle. For a device with a twisted director configuration, the $R_{th}$ definition is the same, though the distortion in off-normal polarization transformation differs from that of an A-Plate, due to the azimuthal distribution in slow-axis. For a normally dark configuration, where the low-voltage state may be most critical to determining the contrast performance over incidence angle, compensation may be included in the PCS, or external to the PCS, to minimize distortion in the polarization transformation over incidence angle. Compensation may include +A-Plates, −A-plates, +C-Plates, and −C-Plates, or combinations of these. C-Plates are uniaxial retarders with optic-axis normal to the substrate, so they only contribute to the polarization transformation at significant off-normal incidence. Note that the PCS may have a non-zero composite $R_{th}$, which tends to be positive for conventional positive uniaxial retarders. Ultimately, the objective may be to insert compensation that minimizes composite $R_{th}$ for the combination of the PCS and the MTN in the low-voltage state.

Figure 15:
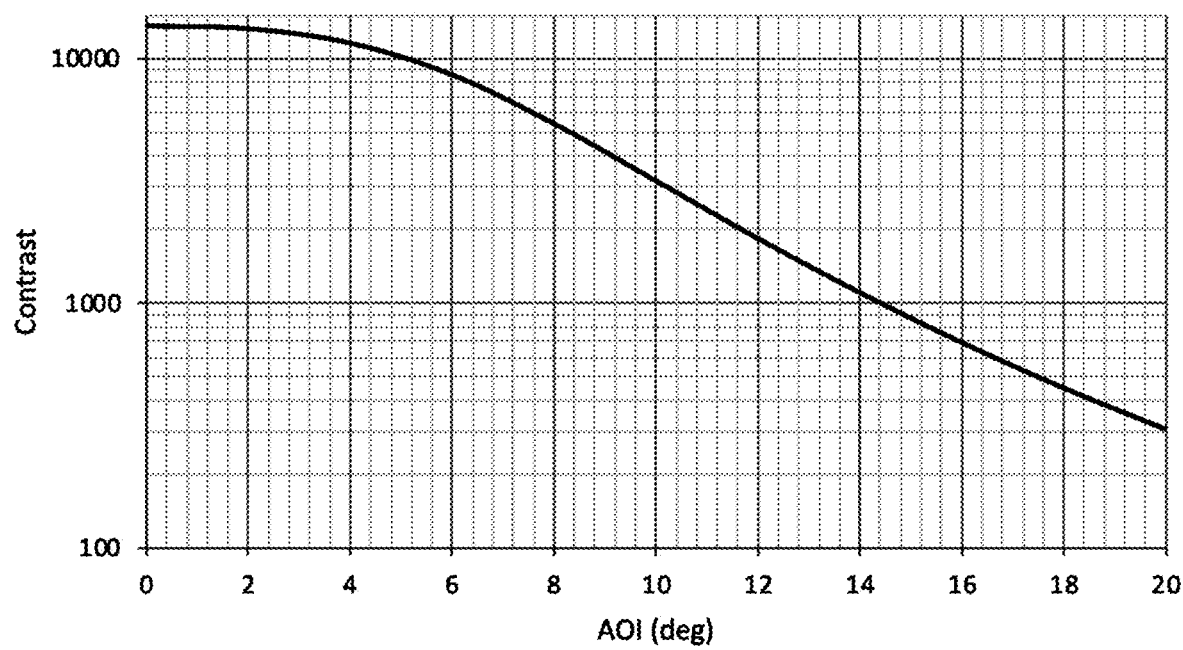
FIG. 15 is a graph of a contrast ratio vs. angle of incidence (or viewing angle) of a compensated optical switch without thickness retardation compensation.

FIG. 15 shows the contrast ratio for the optical switch 1200 of FIGS. 12A-12B versus incidence angle. The PCS stack 1252 has a zero composite $R_{th}$, so the drop in contrast is dominated by the $R_{th}$ of the LC layer 1206. While there are azimuth angles for which contrast is very stable with incidence angle, FIG. 15 shows the contrast at the worst-case azimuth angle. Without compensation for off-axis performance, the contrast falls from over 14,000:1 to below 1,000:1 at the angles of incidence (AOI) of >14°.

In another idealized condition, the director field of the fully energized LC layer 1206 is virtually normal to the device, forming a virtual +C-Plate. For this example, $$R_e = 0 \tag{3}$$

and $$R_{th} = -R_0 \tag{4}$$

At normal incidence, the projection of the director field onto the plane of the device is near zero, so functionally it may be approximated as isotropic. However, the large negative $R_{th}$, or +C-Plate retardation introduces off-normal retardation that can degrade device performance. For a normally-bright architecture, contrast over the FOV depends on compensating the fully energized state of the MTN device. The compensation may have the dual purpose of eliminating residual in-plane retardation and the +C-Plate retardation of the MTN. The latter can be compensated with a −C-Plate retardation, either in a single layer, or as a pair of crossed +A-Plates. The objective in this case may be to insert compensation that minimizes composite $R_{th}$ for the combination of the PCS and the MTN in the high-voltage state.

Figure 16:
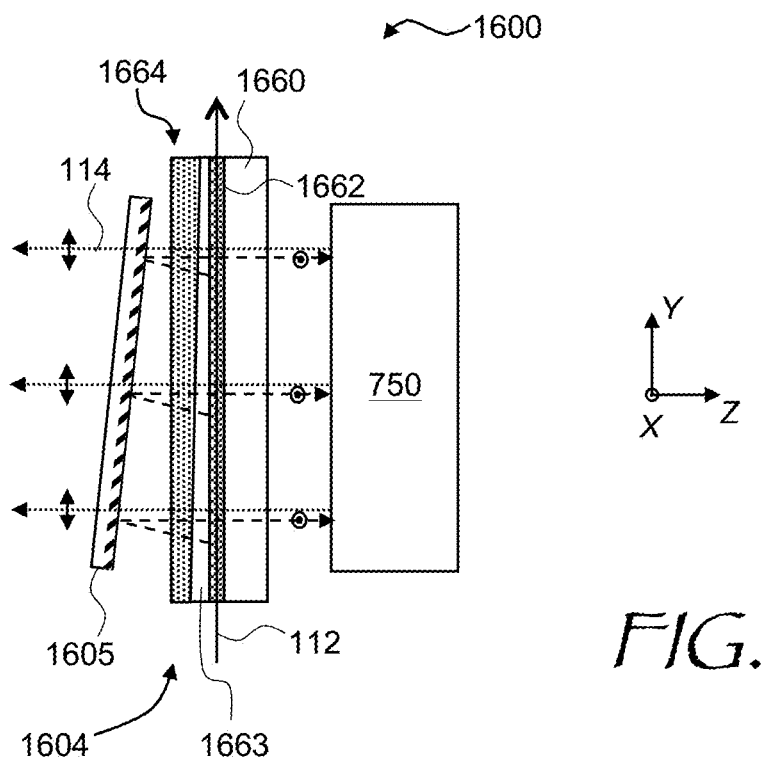
FIG. 16 is a schematic views of an optical switch embodiment of this disclosure with an evanescent frontlight illuminator.

In some embodiments of an optical switch of this disclosure, such as the optical switch 700 of FIGS. 7A-7B, the front-end PBS may be replaced with a more compact lightguide-based frontlight illuminator. Referring for a non-limiting illustrative example to FIG. 16 with further reference to FIGS. 7A-7B, an optical switch 1600 (FIG. 16) includes the polarization rotator 750 of the optical switch 700 of FIGS. 7A-7B, an evanescent frontlight illuminator 1604, and a reflective polarizer 1605. The evanescent frontlight illuminator 1604 includes a substrate 1660, a slab waveguide core 1662 supported by the substrate 1660, and an evanescent out-coupler 1664 supported by the slab waveguide core 1662. In operation, the slab waveguide core 1662 receives and guides the light beam 112 in the core parallel to XY plane. The light beam 112 is gradually out-coupled by the evanescent out-coupler 1664 towards the reflective polarizer 1605.

The evanescent out-coupler 1664 may include a low-index wedge 1663 that creates a leaky mode of propagation of the light beam 112. A thickness of the low-index wedge 1663 gradually decreases to compensate for optical power losses due to the upstream out-coupling. The out-coupled light beam 112 is linearly polarized parallel to X axis upon reflection from the reflective polarizer 1605. The X-polarized light beam illuminates the polarization rotator 750. The reflected light propagates through the evanescent out-coupler 1664 and, depending on its polarization, reflected and/or transmitted by the reflective polarizer 1605. This is a drive-to-black configuration. Other polarizer and polarization rotator configurations of this disclosure may be used.

Figure 17:
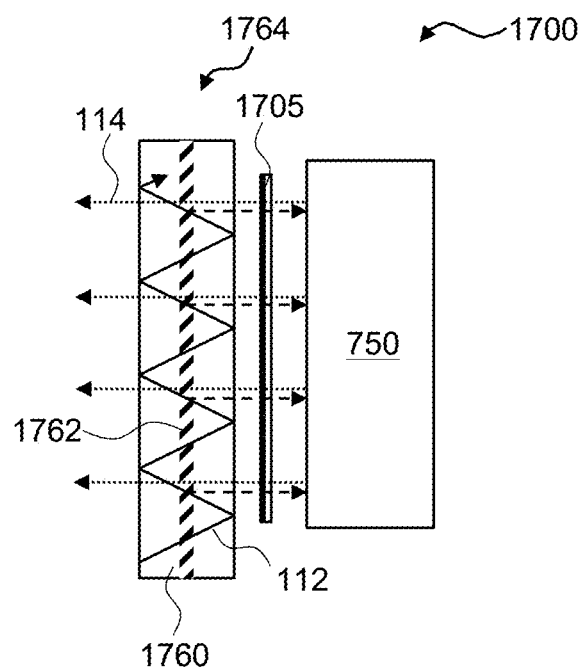
FIG. 17 is a schematic views of an optical switch embodiment of this disclosure with a pupil-replicating frontlight illuminator.

Turning to FIG. 17 with further reference to FIGS. 7A-7B, an optical switch 1700 (FIG. 17) includes the polarization rotator 750 of the optical switch 700 of FIGS. 7A-7B, a replicating lightguide frontlight illuminator 1764, and a transmissive polarizer polarizer 1605. The replicating lightguide frontlight illuminator 1764 includes a slab 1760 of transparent material supporting a volume Bragg grating (VBG) 1762 or another angle-sensitive grating. In operation, the light beam 112 propagates in the slab 1760 by a series of alternating inner reflections from its opposed surfaces, e.g. total internal reflections, along a zigzag optical path as illustrated. The VBG 1762 out-couples portions of the light beam 112, which are polarized by the transmissive polarizer 1605. The reflected light propagates through the frontlight illuminator 1764 and, depending on its polarization, absorbed and/or transmitted by the transmissive polarizer 1705. This is a drive-to-white configuration. Other polarizer and polarization rotator configurations may be used. Furthermore, in some embodiments, frontlight illuminators based on polarizing or non-polarizing geometrical waveguides may be used.

Figure 18:
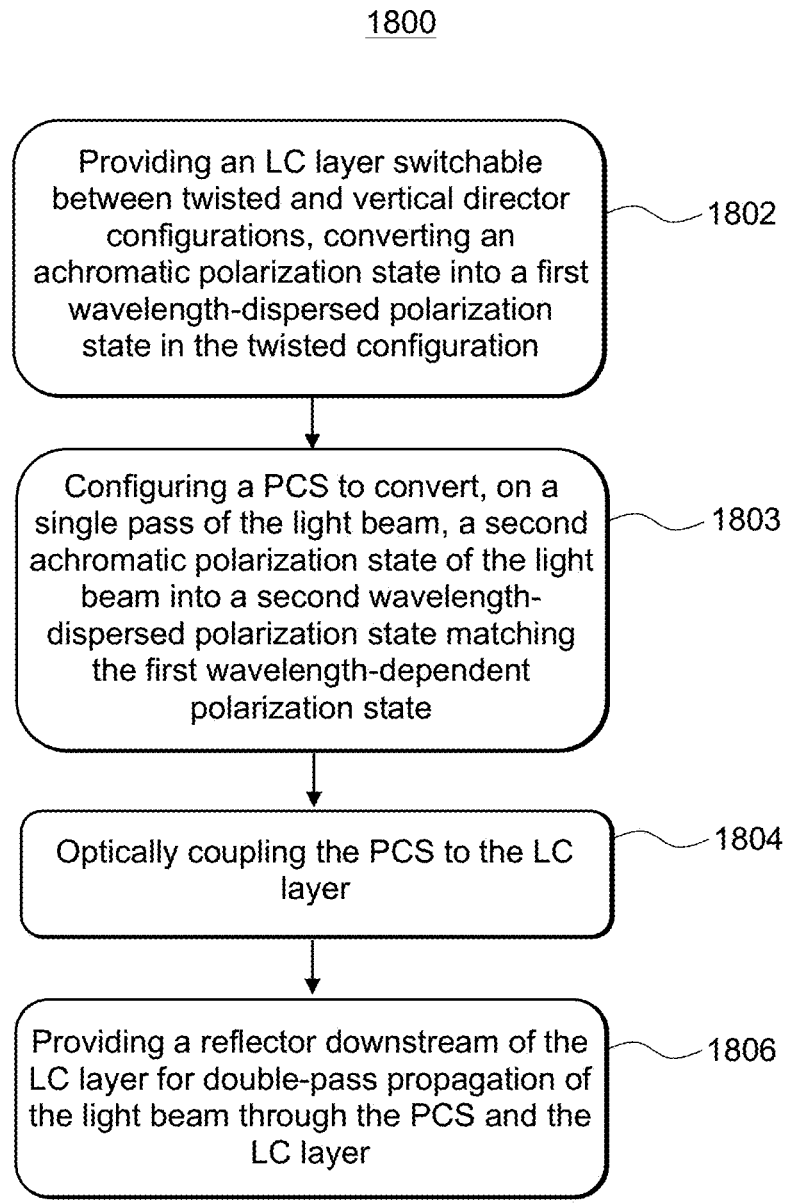
FIG. 18 is a flow chart of a method for lessening a wavelength dependence of throughput of an optical switch comprising a switchable LC layer.

Referring now to FIG. 18, a method 1800 for lessening a wavelength dependence of throughput of an optical switch of this disclosure includes providing (1802) an LC layer is switchable between an undriven state having a twisted LC director configuration and a driven state having a substantially vertical LC director configuration. When in the undriven state, the LC layer (e.g. the LC layer 706 of the polarization rotator 750 of FIGS. 7A-7B) converts, on a single pass of a light beam, a first achromatic polarization state of the light beam into a first wavelength distribution of polarization states.

A passive compensation structure (PCS) is provided and optically coupled (1804) to the LC layer, e.g. the PCS 752 optically coupled to the LC layer 706. The PCS 752 may include a stack of fixed-retardation layers as shown e.g. in FIGS. 10 and 12A, 12B. The PCS may be configured (1803) e.g. via a global optimization to convert, on a single pass of the light beam, a second achromatic polarization state of the light beam into a second wavelength distribution of polarization states matching the first wavelength distribution. When the LC layer is in the undriven state and the light beam impinging onto the polarization rotator is in the second achromatic polarization state, a polarization state of the light beam at the reflector is the first achromatic polarization state. The achromatic performance of the polarization rotator on a single pass when, for example, a linear achromatic polarization is converted into a circular achromatic polarization, will ensure the achromatic conversion between orthogonal linear polarization based on the Properties A-E of the reversed-order (RO) stacks discussed above. The method 1800 may further include providing (1806) a reflector, e.g. the reflector 708, to configure a double-pass propagation through the PCS-LC layer stack.

An Embodiment 1 of the method 800 is provided herein for lessening a wavelength dependence of throughput of an optical switch comprising an LC layer switchable between an undriven state having a twisted LC director configuration and a driven state having a substantially vertical LC director configuration, wherein, when in the undriven state, the LC layer converts, on a single pass of a light beam, a first achromatic polarization state of the light beam into a first wavelength distribution of polarization states. Embodiment 1 comprises providing a PCS optically coupled to the LC layer and comprising a stack of fixed-retardation layers configured to convert, on a single pass of the light beam, a second achromatic polarization state of the light beam into a second wavelength distribution of polarization states matching the first wavelength distribution.

An Embodiment 2 of the method 800 is provided herein. The Embodiment 2 incorporates all features of the Embodiment 1. In the Embodiment 2, when the LC layer is in the undriven state and the light beam impinging onto the PCS is in the second achromatic polarization state, a polarization state of the light beam at an output of the LC layer is the first achromatic polarization state.

Figure 19:
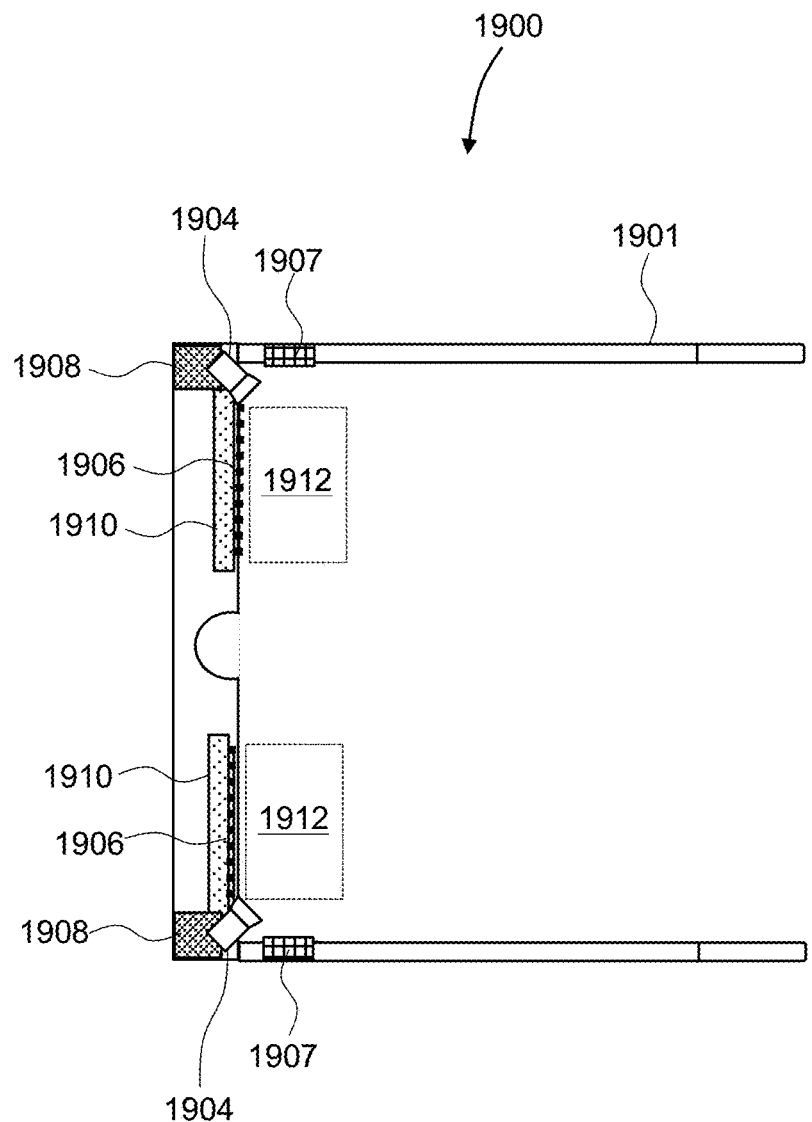
FIG. 19 is a view of an augmented reality (AR) display of this disclosure having a form factor of a pair of eyeglasses.

Turning to FIG. 19, an augmented reality (AR) near-eye display 1900 includes a frame 1901 having a form factor of a pair of eyeglasses. The frame 1901 supports, for each eye: a projector 1908 including any of the optical switches/display panels disclosed herein, a pupil-replicating waveguide 1910 optically coupled to the projector 1908, an eye-tracking camera 1904, a plurality of illuminators 1906, and an eye-tracking camera controller 1907. The illuminators 1906 may be supported by the pupil-replicating waveguide 1910 for illuminating an eyebox 1912. The projector 1908 provides a fan of light beams carrying an image in angular domain to be projected into a user's eye. The pupil-replicating waveguide 1910 receives the fan of light beams and provides multiple laterally offset parallel copies of each beam of the fan of light beams, thereby extending the projected image over the eyebox 1912.

For AR applications, the pupil-replicating waveguide 1910 can be transparent or translucent to enable the user to view the outside world together with the images projected into each eye and superimposed with the outside world view. The images projected into each eye may include objects disposed with a simulated parallax, so as to appear immersed into the real world view.

The purpose of the eye-tracking cameras 1904 is to determine position and/or orientation of both eyes of the user. Once the position and orientation of the user's eyes are known, a gaze convergence distance and direction may be determined. The imagery displayed by the projectors 1908 may be adjusted dynamically to account for the user's gaze, for a better fidelity of immersion of the user into the displayed augmented reality scenery, and/or to provide specific functions of interaction with the augmented reality. In operation, the illuminators 1906 illuminate the eyes at the corresponding eyeboxes 1912, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1912.

The function of the eye-tracking camera controllers 1907 is to process images obtained by the eye-tracking cameras 1904 to determine, in real time, the eye gazing directions of both eyes of the user. In some embodiments, the image processing and eye position/orientation determination functions may be performed by a central controller, not shown, of the AR near-eye display 1900. The central controller may also provide control signals to the projectors 1908 to generate the images to be displayed to the user, depending on the determined eye positions, eye orientations, gaze directions, eyes vergence, etc.

Figure 20:
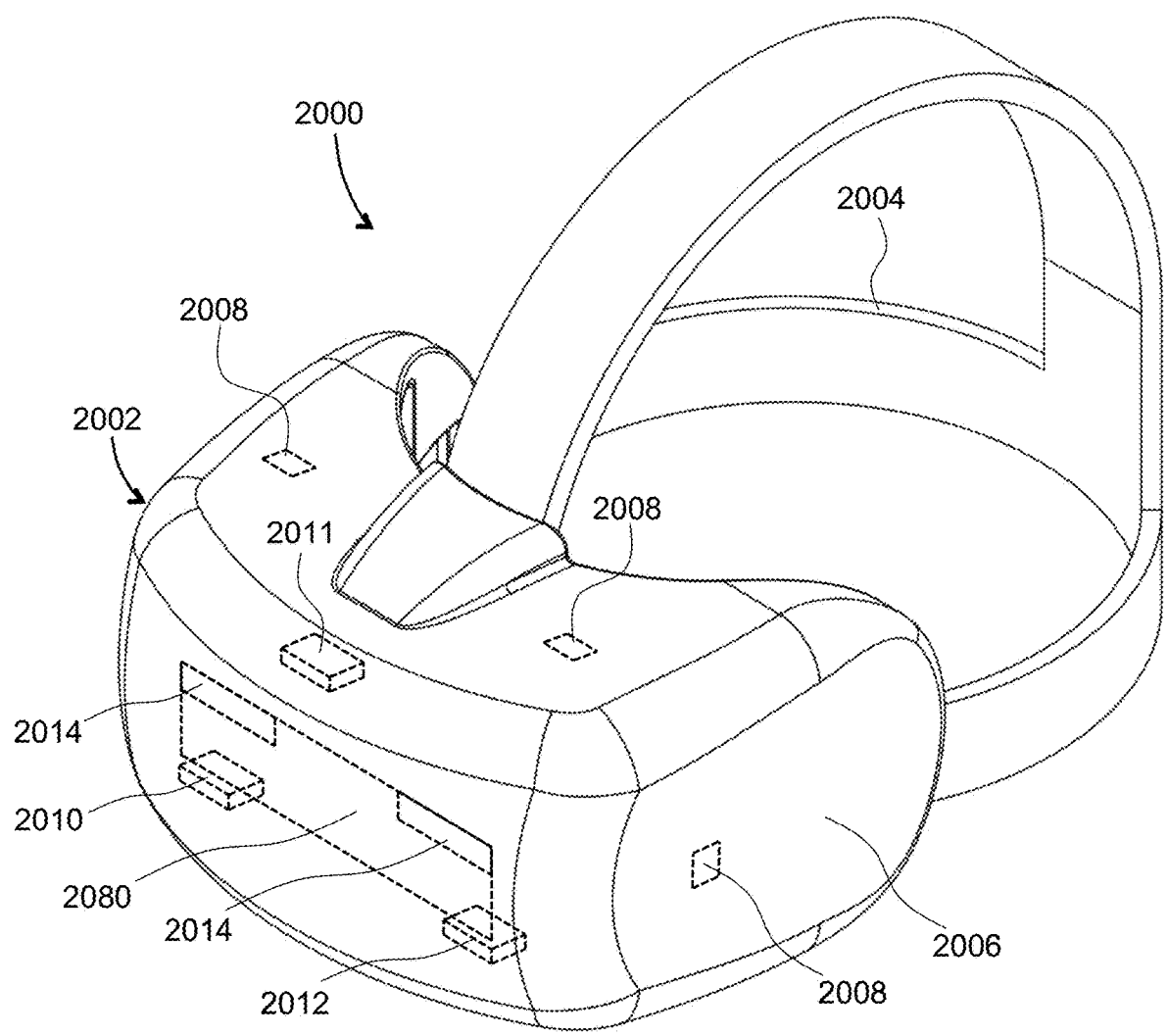
FIG. 20 is a three-dimensional view of a head-mounted display (HMD) of this disclosure.

Referring now to FIG. 20, an HMD 2000 is an example of an AR/VR wearable display system which encloses the user's face, for a greater degree of immersion into the AR/VR environment. The HMD 2000 may generate the entirely virtual 3D imagery. The HMD 2000 may include a front body 2002 and a band 2004 that can be secured around the user's head. The front body 2002 is configured for placement in front of eyes of a user in a reliable and comfortable manner. A display system 2080 may be disposed in the front body 2002 for presenting AR/VR imagery to the user. The display system may include any of the optical switches, polarization rotators, and display panels with achromatic performance as disclosed herein. Sides 2006 of the front body 2002 may be opaque or transparent.

In some embodiments, the front body 2002 includes locators 2008 and an inertial measurement unit (IMU) 2010 for tracking acceleration of the HMD 2000, and position sensors 2012 for tracking position of the HMD 2000. The IMU 2010 is an electronic device that generates data indicating a position of the HMD 2000 based on measurement signals received from one or more of position sensors 2012, which generate one or more measurement signals in response to motion of the HMD 2000. Examples of position sensors 2012 include: one or more accelerometers, one or more gyroscopes, one or more magnetometers, another suitable type of sensor that detects motion, a type of sensor used for error correction of the IMU 2010, or some combination thereof. The position sensors 2012 may be located external to the IMU 2010, internal to the IMU 2010, or some combination thereof.

The locators 2008 are traced by an external imaging device of a virtual reality system, such that the virtual reality system can track the location and orientation of the entire HMD 2000. Information generated by the IMU 2010 and the position sensors 2012 may be compared with the position and orientation obtained by tracking the locators 2008, for improved tracking accuracy of position and orientation of the HMD 2000. Accurate position and orientation is important for presenting appropriate virtual scenery to the user as the latter moves and turns in 3D space.

The HMD 2000 may further include a depth camera assembly (DCA) 2011, which captures data describing depth information of a local area surrounding some or all of the HMD 2000. The depth information may be compared with the information from the IMU 2010, for better accuracy of determination of position and orientation of the HMD 2000 in 3D space.

The HMD 2000 may further include an eye tracking system 2014 for determining orientation and position of user's eyes in real time. The obtained position and orientation of the eyes also allows the HMD 2000 to determine the gaze direction of the user and to adjust the image generated by the display system 2080 accordingly. The determined gaze direction and vergence angle may be used to adjust the display system 2080 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 2002.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A passive compensation structure (PCS) for a liquid crystal (LC) layer switchable between an undriven state corresponding to a twisted LC director configuration and a driven state corresponding to a substantially vertical LC director configuration, wherein the LC layer is configured to rotate, when the LC layer is in the undriven state, an achromatic polarization state of a light beam orthogonally upon completion of a double pass of the light beam through the LC layer, the PCS comprising:
   a stack of fixed-retardation layers configured to rotate, when the LC layer is in the undriven state, the achromatic polarization state of the light beam orthogonally upon completion of a double pass of the light beam through the PCS such that the achromatic polarization state of the light beam received by the PCS and the achromatic polarization state of the light beam exiting the PCS are orthogonal to one another.

2. The PCS of claim 1, wherein, when the LC layer is in the undriven state and the achromatic polarization state of the light beam impinging onto the PCS has a first orientation, the achromatic polarization state of the light beam at an output of the LC layer has a second orientation.

3. A polarization rotator comprising:
   a reflective liquid crystal (LC) device comprising an LC layer that is coupled to a reflector and switchable between an undriven state corresponding to a twisted LC director configuration and a driven state corresponding to a substantially vertical LC director configuration, wherein the reflective LC device is configured to rotate, when the LC layer is in the undriven state, an achromatic polarization state of a light beam orthogonally upon completion of a double pass of the light beam through the reflective LC device; and
   a passive compensation structure (PCS) disposed upstream of the reflective LC device and comprising a stack of fixed-retardation layers, wherein the PCS is configured to rotate, when the LC layer is in the undriven state, the achromatic polarization state of the light beam orthogonally upon completion of a double pass of the light beam through the PCS such that the achromatic polarization state of the light beam received by the polarization rotator and the achromatic polarization state of the light beam exiting the polarization rotator are orthogonal to one another.

4. The polarization rotator of claim 3, wherein a twist angle of the twisted LC director configuration is less than 90 degrees.

5. The polarization rotator of claim 3 wherein, when the LC layer is in the undriven state, the polarization rotator converts between orthogonal achromatic polarization states of the light beam propagated through the PCS and the LC layer, reflected by the reflector, and propagated back through the LC layer and the PCS.

6. The polarization rotator of claim 5 wherein, when the LC layer is in the undriven state and the achromatic polarization state of the light beam impinging onto the PCS is an achromatic linear polarization state, the achromatic polarization state of the light beam at the reflector is an achromatic circular polarization state.

7. The polarization rotator of claim 3 wherein, when the LC layer is in the driven state, the polarization rotator substantially preserves, at its output, the achromatic polarization state of the light beam impinging onto the polarization rotator.

8. The polarization rotator of claim 7 wherein, when the LC layer is in the driven state and the achromatic polarization state of the light beam impinging onto the PCS is an achromatic linear polarization state, the light beam at the reflector has a non-achromatic linear polarization state.

9. The polarization rotator of claim 3 wherein, when the LC layer is in the undriven state and the achromatic polarization state of the light beam impinging onto the PCS has a first orientation, the achromatic polarization state of the light beam at the reflector has a second orientation.

10. The polarization rotator of claim 3, wherein a non-zero voltage is applied to the LC layer in the undriven state to match the achromatic polarization state of the light beam upon completion of the double pass through the reflective LC device and the achromatic polarization state of the light beam upon completion of the double pass through the PCS to one another.

11. The polarization rotator of claim 3, wherein the stack of fixed-retardation layers comprises A-plates.

12. The polarization rotator of claim 11, wherein all A-plates of the stack have substantially a same in-plane retardation and differing directions of optic axis.

13. The polarization rotator of claim 11, wherein the stack further comprises a C-plate for improving off-axis performance of the polarization rotator.

14. The polarization rotator of claim 3, wherein the stack of fixed-retardation layers comprises cyclic olefin polymer.

15. The polarization rotator of claim 3, wherein:
when the LC layer is in the undriven state, the polarization rotator converts the achromatic polarization state of the light beam to an orthogonal orientation in a spectral bandwidth of between 450 nm and 700 nm; and
when the LC layer is in the driven state, the polarization rotator substantially preserves the achromatic polarization state of the light beam in the spectral bandwidth of between 450 nm and 700 nm.

16. The polarization rotator of claim 3, wherein:
the PCS is further configured to convert the light beam from an achromatic horizontal polarization to a non-achromatic wavelength-dispersed linear polarization during a forward pass; and
the reflective LC device is further configured to covert the light beam from the non-achromatic wavelength-dispersed linear polarization to a near-circular elliptical polarization during the forward pass.

17. An optical switch comprising:
a frontlight illuminator for providing a light beam;
a polarization rotator downstream of the frontlight illuminator, for receiving and redirecting the light beam to propagate back through the frontlight illuminator; and
a polarizer downstream of the polarization rotator for transmitting or blocking the light beam depending on an achromatic polarization state of the light beam;
the polarization rotator comprising:
a reflective liquid crystal (LC) device comprising an LC layer that is coupled to a reflector and switchable between an undriven state corresponding to a twisted LC director configuration and a driven state corresponding to a substantially vertical LC director configuration, wherein the reflective LC device is configured to rotate, when the LC layer is in the undriven state, the achromatic polarization state of the light beam orthogonally upon completion of a double pass of the light beam through the reflective LC device; and
a passive compensation structure (PCS) disposed upstream of the reflective LC device and comprising a stack of fixed-retardation layers, wherein the PCS is configured to rotate, when the LC layer is in the undriven state, the achromatic polarization state of the light beam orthogonally upon completion of a double pass of the light beam through the PCS such that the achromatic polarization state of the light beam received by the polarization rotator and the achromatic polarization state of the light beam exiting the polarization rotator are orthogonal to one another.

18. The optical switch of claim 17, wherein:
when the LC layer is in the undriven state, the polarization rotator converts the achromatic polarization state of the light beam to an orthogonal orientation; and
when the LC layer is in the driven state, the polarization rotator preserves the achromatic polarization state of the light beam.

19. The optical switch of claim 17, wherein the LC layer of the polarization rotator comprises an array of individually controllable LC pixels.

20. The optical switch of claim 19, wherein the frontlight illuminator comprises at least one of an evanescent outcoupler or a replicating lightguide for providing a portion of the light beam to each LC pixel of the array.

* * * * *